(12) United States Patent
Samid

(10) Patent No.: US 10,798,065 B2
(45) Date of Patent: Oct. 6, 2020

(54) RANDOMIZED BILATERAL TRUST (RABIT): TRUST BUILDING CONNECTIVITY FOR CYBER SPACE

(71) Applicant: Gideon Samid, Rockville, MD (US)

(72) Inventor: Gideon Samid, Rockville, MD (US)

( * ) Notice: Subject to any disclaimer, the term of this patent is extended or adjusted under 35 U.S.C. 154(b) by 0 days.

(21) Appl. No.: 15/997,662

(22) Filed: Jun. 4, 2018

(65) Prior Publication Data
US 2018/0351917 A1 Dec. 6, 2018

Related U.S. Application Data

(60) Provisional application No. 62/514,905, filed on Jun. 4, 2017, provisional application No. 62/544,848, filed on Aug. 13, 2017.

(51) Int. Cl.
| | | |
|---|---|---|
| *H04L 29/06* | (2006.01) | |
| *H04L 9/32* | (2006.01) | |
| *H04L 9/08* | (2006.01) | |

(52) U.S. Cl.
CPC ............. *H04L 63/04* (2013.01); *H04L 9/085* (2013.01); *H04L 9/0838* (2013.01); *H04L 9/0852* (2013.01); *H04L 9/321* (2013.01); *H04L 9/3236* (2013.01); *H04L 2209/08* (2013.01); *H04L 2209/38* (2013.01); *H04L 2209/56* (2013.01)

(58) Field of Classification Search
CPC ....... H04L 63/04; H04L 9/0838; H04L 9/085; H04L 9/0852; H04L 9/321; H04L 9/3236
See application file for complete search history.

(56) References Cited

U.S. PATENT DOCUMENTS

| | | | | |
|---|---|---|---|---|
| 8,656,484 B2* | 2/2014 | Barton | ................. | H04L 9/0844 380/277 |
| 8,868,919 B2* | 10/2014 | Barton | ................... | G06F 21/36 713/182 |
| 8,955,074 B2* | 2/2015 | Barton | ..................... | G09C 5/00 713/182 |
| 9,215,072 B1* | 12/2015 | Barton | ................. | H04L 63/083 |
| 9,531,542 B2* | 12/2016 | Barbir | .................. | H04L 9/3226 |
| 10,013,569 B2* | 7/2018 | Wu | ......................... | H04L 9/008 |
| 2012/0166809 A1* | 6/2012 | Barton | ................. | H04L 9/0844 713/181 |

\* cited by examiner

*Primary Examiner* — Yonas A Bayou

(57) ABSTRACT

This invention amounts to tools and procedures designed to use randomness sources to establish a secure communication between two nodes in cyber space, and then building on these bilateral trust elements to spread trust throughout the network. Applications include online identity management, and secure payment platforms. This trust build-up from bilateral connections may serve as a blockchain alternative. The bilateral trust solution is not based on mathematical complexity, as the prevailing solutions, but rather on the perfect unpredictability of quantum grade randomness, and as such it is well positioned to withstand cryptanalytic attacks based on quantum computing capability now secretly developed by powerful adversaries.

2 Claims, 12 Drawing Sheets

FigLeaf: Spontaneous Security

Public Reference Set $$R(a,b) = \frac{\Delta V}{i}$$

Randomized Resistance $$R(a,b) = \frac{\Delta V}{i}$$

Randomized Resistance $$R(a,b) = \frac{\Delta V}{i}$$

Randomized Resistance

The Figleaf Brick with marked electrode point on frontal surface

Figure 3:
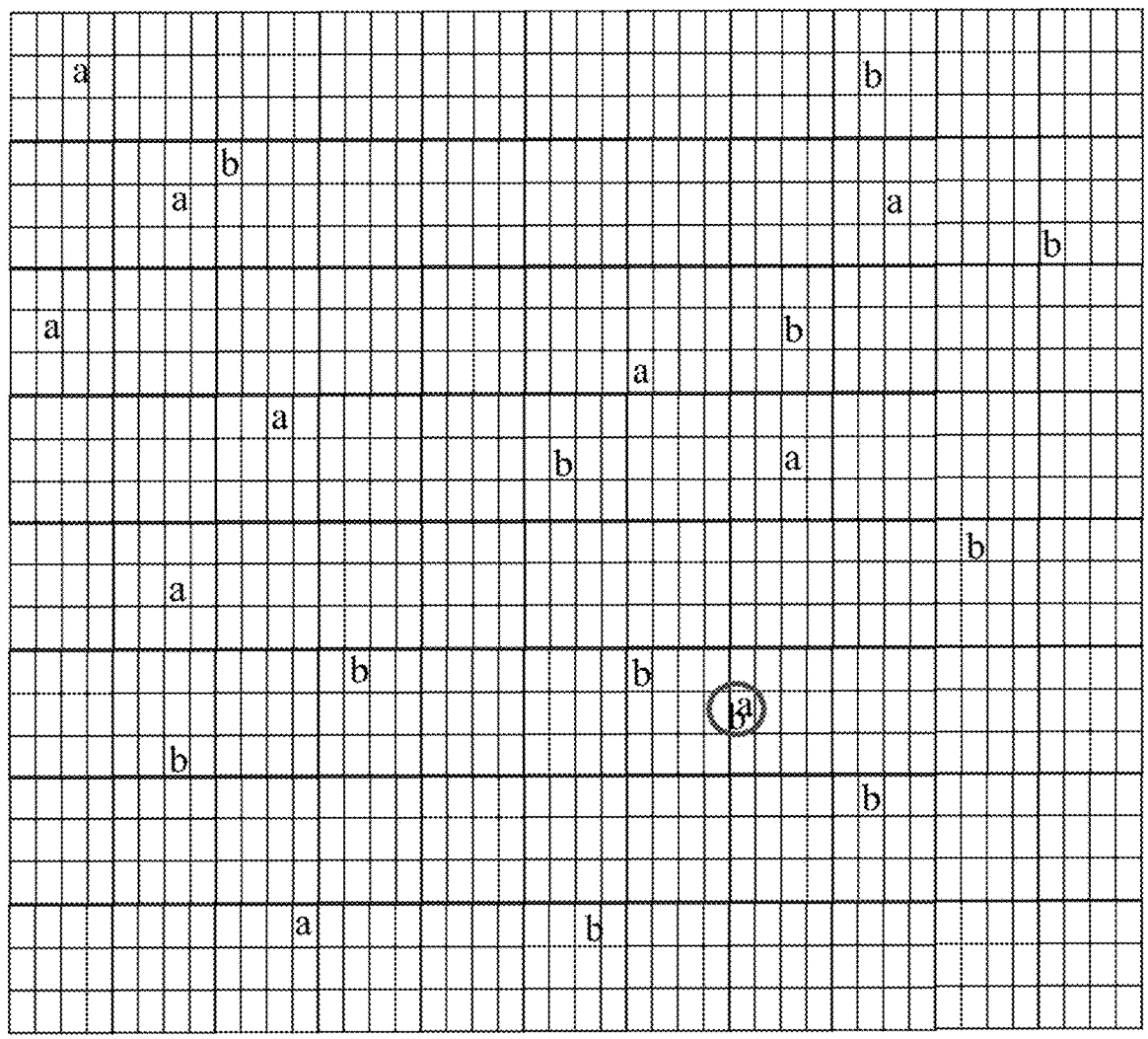

Fig-3: Marked Randomized Selection by Privacy Seekers

Figure 4:
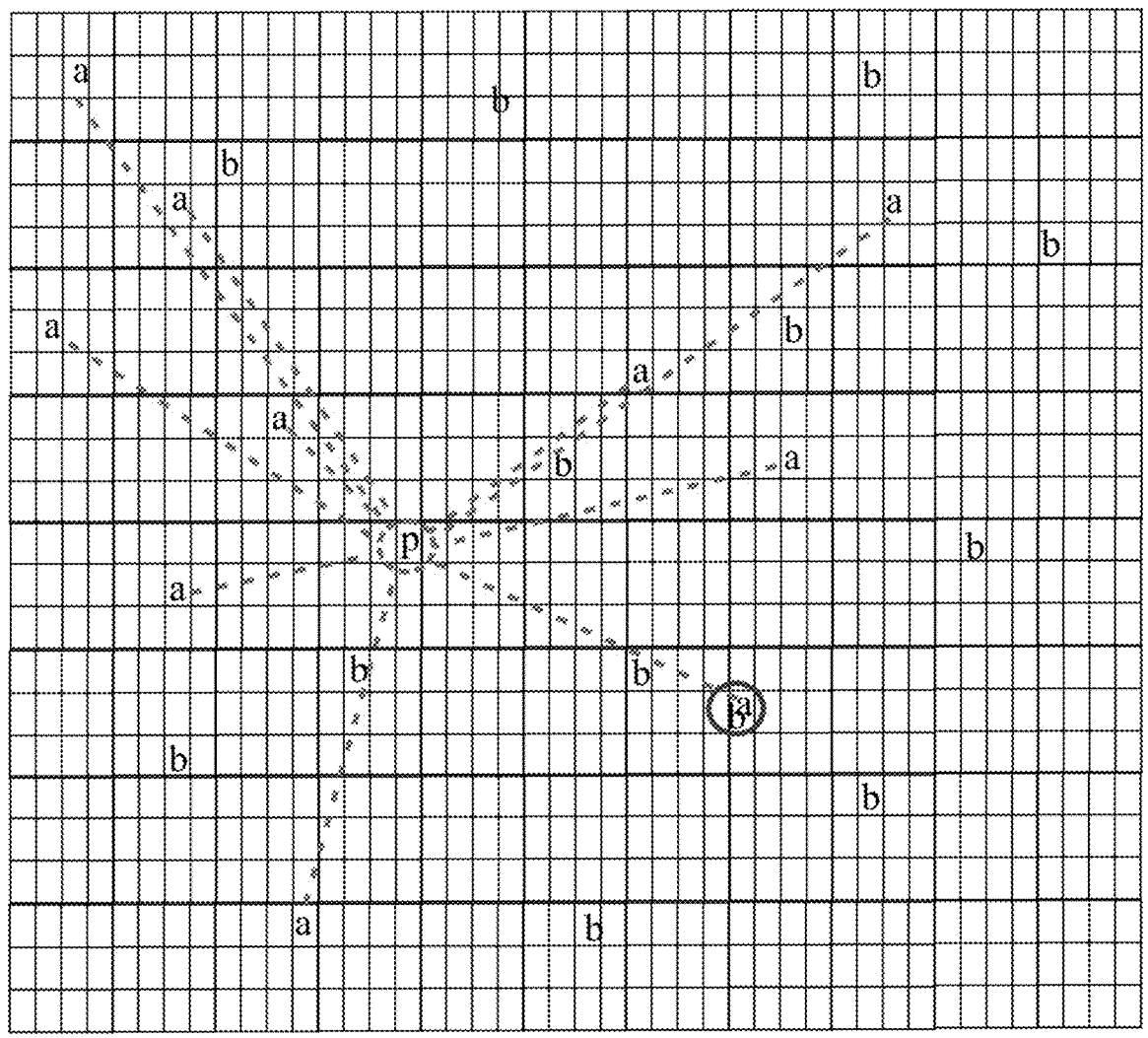

Fig-4: Alice Chooses a Projection Point (p) and Measured the Respective Currents Fig-5: Bob's Chooses a Projection Point (p) and Measured the Respective Currents

A FigLeaf Brick of Randomized Shape
(8 faces)

3D Printing of FigLeaf Bricks

Entropic Advantage

H(PS) -- the entropy of the privacy seekers drops faster than H(PK), the entropy of the Privacy Killers

FigTree

A community of cyber entities executes four rounds
of FigLeaf to fully securely cross-connect

RANDOMIZED BILATERAL TRUST (RABIT): TRUST BUILDING CONNECTIVITY FOR CYBER SPACE

CROSS REFERENCE TO RELATED APPLICATIONS

This application claims as priority date of:
Provisional Application #62/514,905 filed on Jun. 4, 2017
Provisional Application #62/544,848 filed on Aug. 13, 2017
Provisional Application #62/608,481 filed on Dec. 20, 2017
Provisional Application #62/581,752 filed on Nov. 5, 2017
Provisional Application #62/580,111 filed on Nov. 1, 2017
Provisional Application #62/619,854 filed on Jan. 21, 2018
Provisional Application #62/638,304 filed on Mar. 5, 2018
Provisional Application #62/647,760 filed on Mar. 25, 2018
Provisional Application #62/671,421 filed on May 15, 2018

BACKGROUND OF THE INVENTION

Online transactions are subject to fraud and identity theft. Fraudsters masquerade as others, steal credentials, and wreck havoc on good order in cyber space. The current protection is based mathematical complexity cryptography, which is inherently vulnerable to cryptanalytic insight. The agencies that develop such insight keep this fact well hidden, so users don't know whether they have been compromised. Recently quantum grade randomness has become commercially available, and it may be regarded as cyber-oil, since it resembles functionally what crude oil facilitated in the last century. This invention is another security and trust solution based more on randomness and less on algorithmic complexity. And since quantum-grade randomness cannot be defeated by some superior intellect, it serves as a solid countermeasure against weaponized quantum-computing machines now secretly developed by powerful adversaries.

BRIEF SUMMARY OF THE INVENTION

A method to use randomness sources to establish a secure communication between two nodes in cyber space, and then building on these bilateral trust elements to spread trust throughout the network. This trust build-up from bilateral connections may serve as a blockchain alternative.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISK APPENDIX

Not Applicable.

BRIEF EXPLANATION OF DRAWINGS (FIGLEAF, RABIT)

Figure 1A:
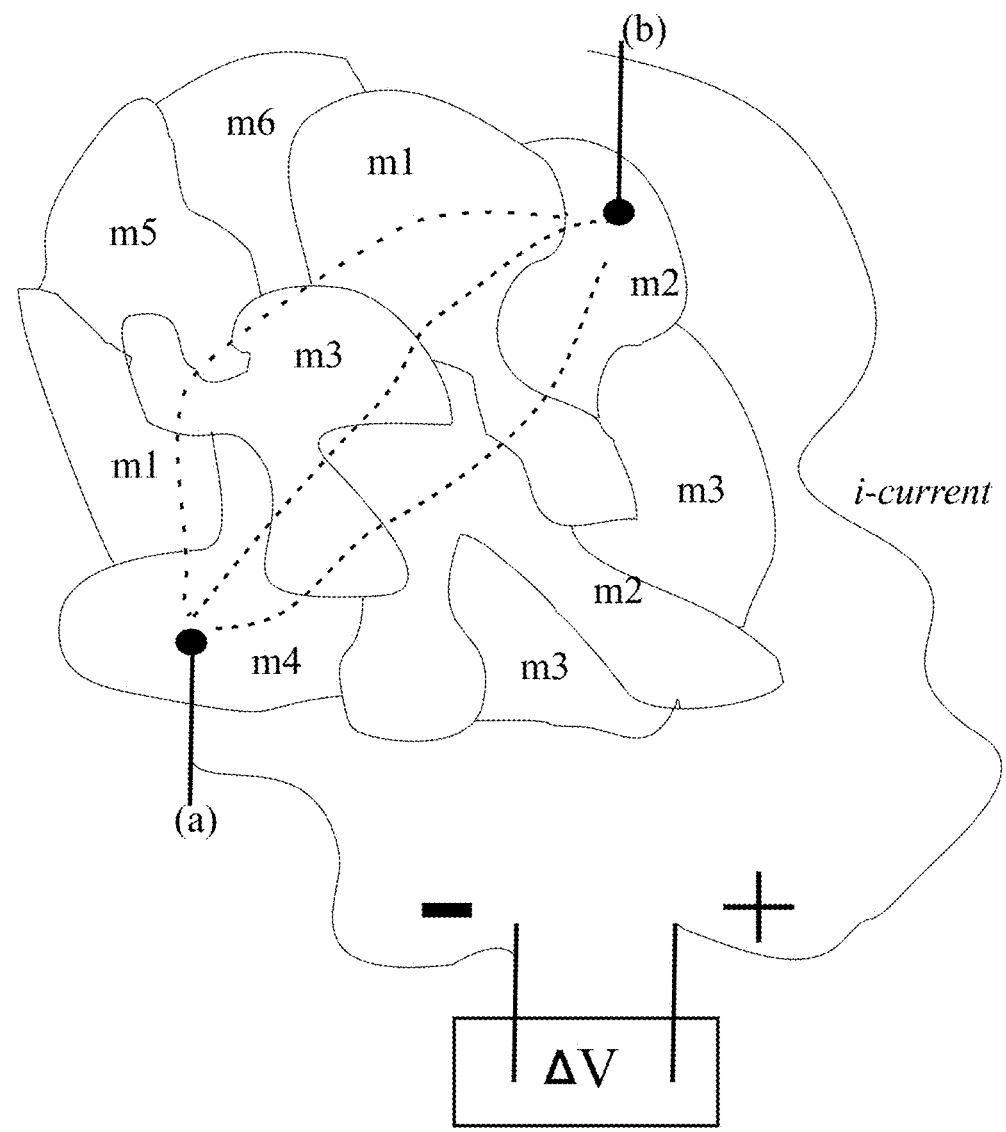

FIG. 1a Randomized Resistance: The figure illustrates the packed "FigLeaf brick" comprised of randomizes chunks of materials m1, m2, m3, m4, m5, m6 characterized by having different and unique electric resistance. The figure shows two arbitrary points in the brick: (a) and (b) to which a voltage difference $\Delta V$ is being applied. The voltage difference creates an electric current i which reflect the randomized combination of semi-conducting and varying conducting materials (m1, m2, . . . ). The exact current reflects the exact geometry of the packed varying conductivity materials (m1, m2 . . . ). The measurement is fast and accurate, and allows one to calculate the effective resistance between the two points (a) and (b):

$$R = \Delta V/i$$

Figure 1B:
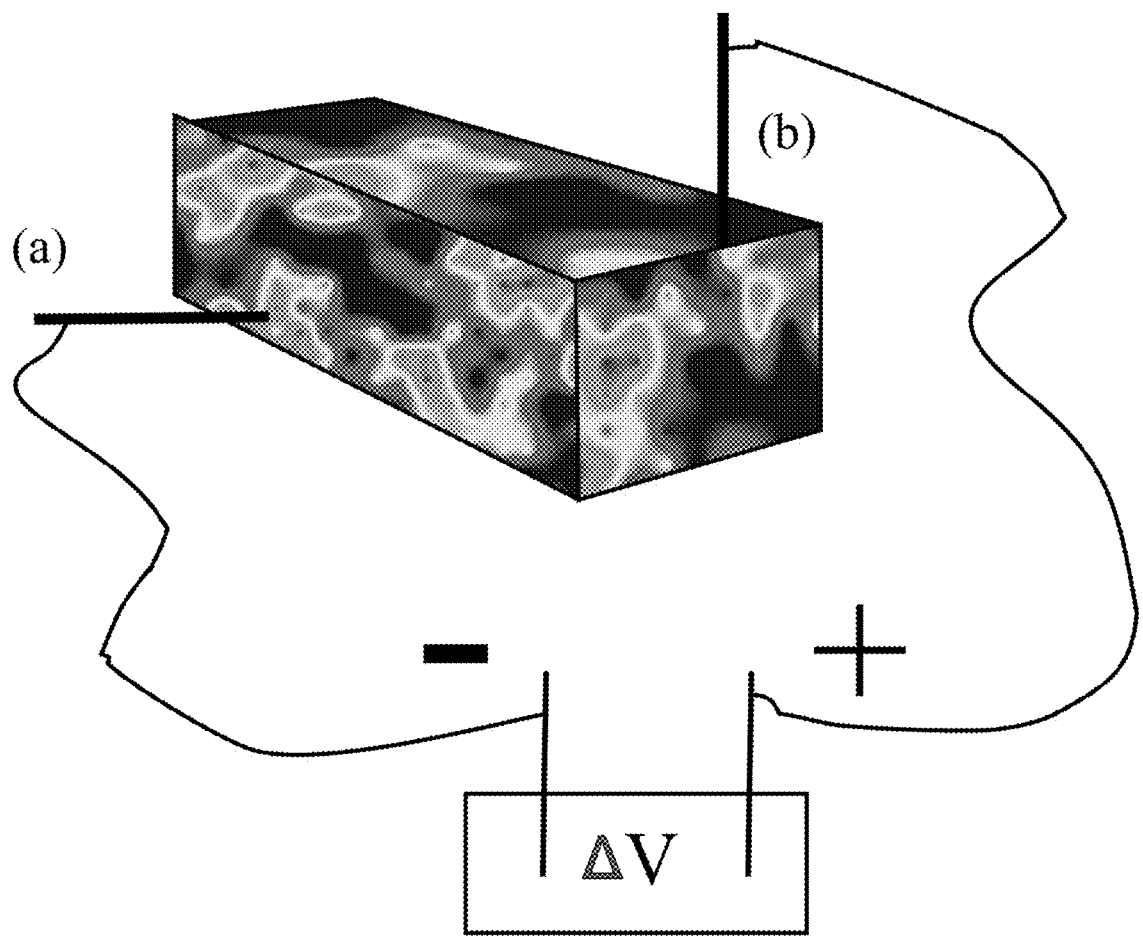
Figure 1C:
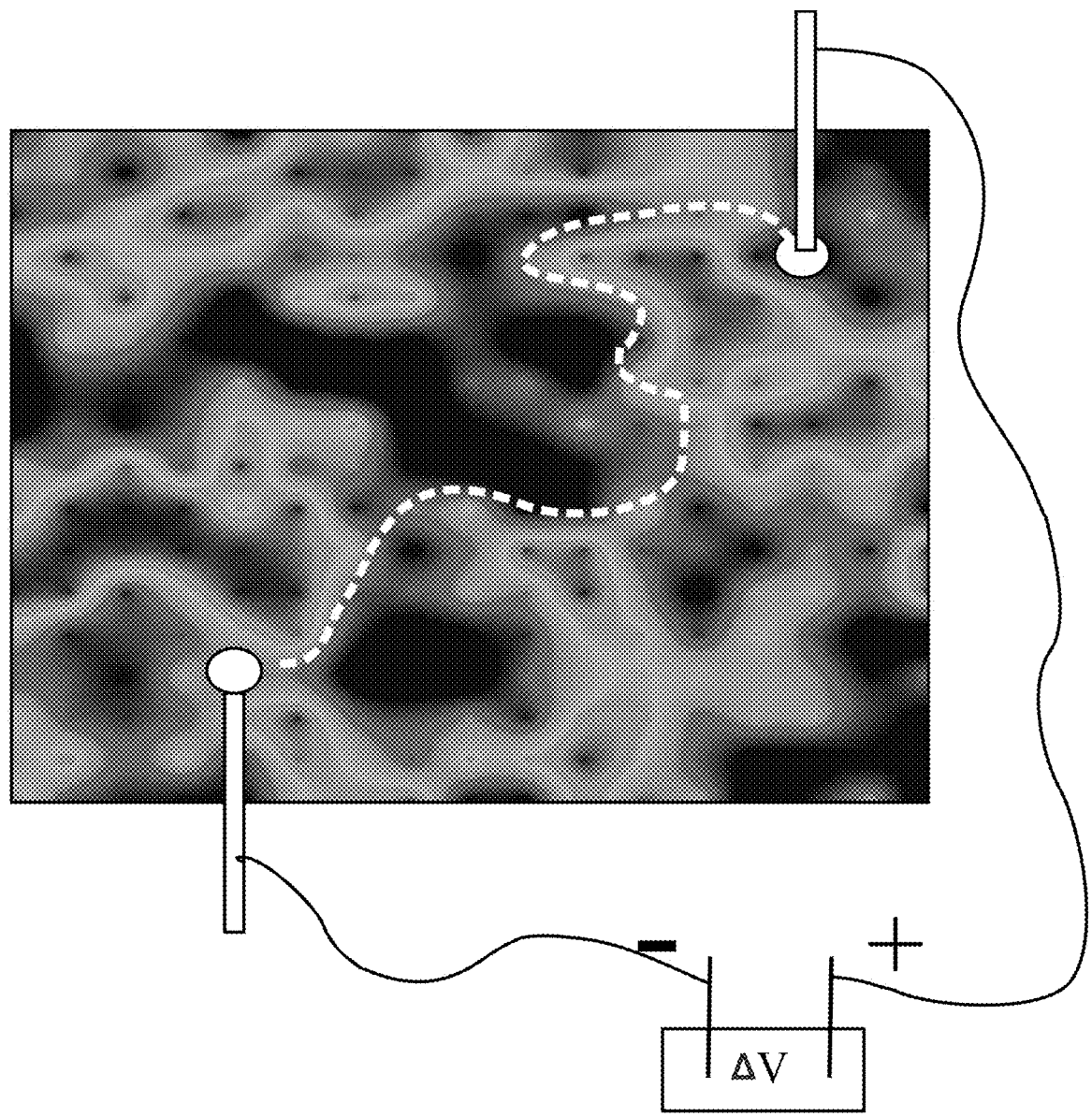

FIG. 1b: Randomized Resistance: this figure shows the same concept of connecting two arbitrary points on the FigLeaf brick to a set potential difference, $\Delta V$. Here the brick is shown in 3D projection, and the randomized packing of the varying conductivity materials are shown in color, an FIG. 1c: Randomized Resistance: here is a third depiction of the same concept. It emphasizes that the current seeks the easiest path across the packed varying conductivity materials, and the value of the current reflects the packing of the varying conductivity materials between the two points to which a potential difference is applied.

Figure 2:
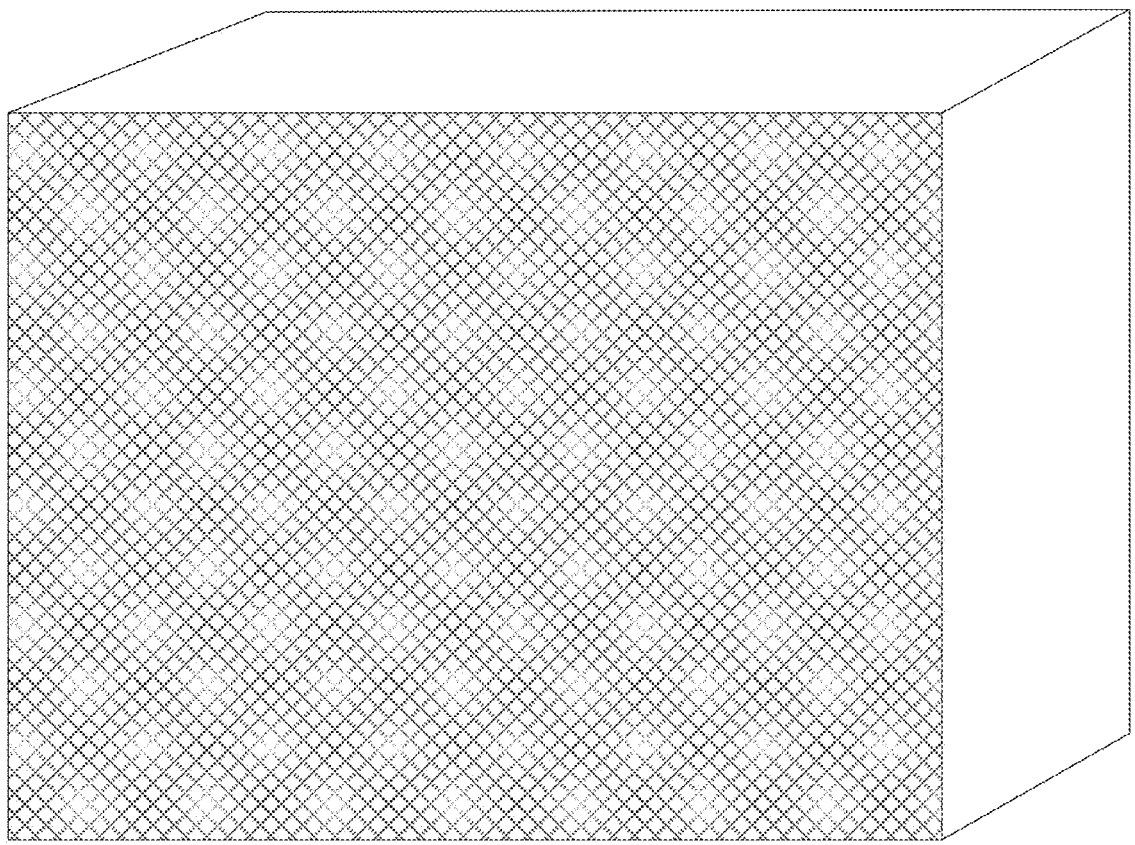

FIG. 2: The FigLeaf Brick with marked Electrode Points: This figure illustrates the imprinting of a grid (shown diagonally) that identifies points on the brick (only one face is marked), each crossing point reflects an address of a unique point that can be selected by Alice or Bob in their randomized selection of brick points.

FIG. 3: Marked Randomized Selection by Privacy Seekers: this figure depicts a face of marked electrode points (represented as white rectangular) on the FigLeaf brick. The points selected by Alice are marked with the letter "a", and the points selected by Bob are marked with the letter "b". The figure shows that "by chance" the two sets of a points and b points (both sets selected randomly) have one electrode-point in common (marked with the red circle).

FIG. 4: Alice Chooses a Projection Point (p) and Measures the Respective Currents: The figure shows how Alice determines the values of a given property over its set of randomly selected points on the FigLeaf brick. The property Alice chooses is the current, or resistance displayed between the selected project point p, and each of Alice's selection points on the brick. The respective currents are shown as dotted lines between "p" and each and every points on Alice's selection.

Figure 5:
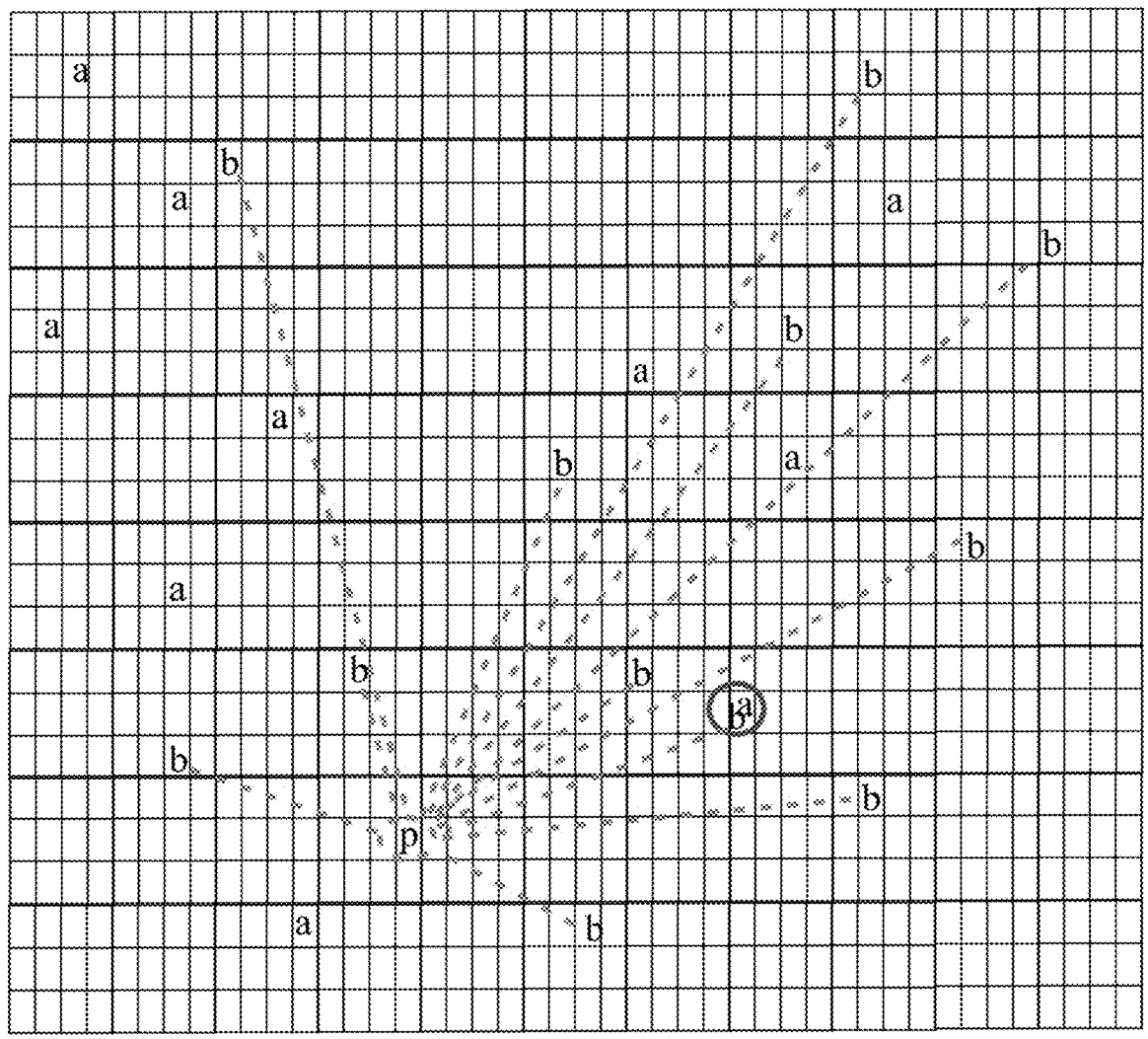

FIG. 5: Bob Chooses a Projection Point (p)d and measures the respective currents: The figure shows how Bob determines the values of a given property over its set of randomly selected points on the FigLeaf brick. The property Bob chooses is the current, or resistance displayed between the selected project point p, and each of Bob's selection points on the brick. The respective currents are shown as dotted lines between "p" and each and every points on Bob's selection.

Figure 6:
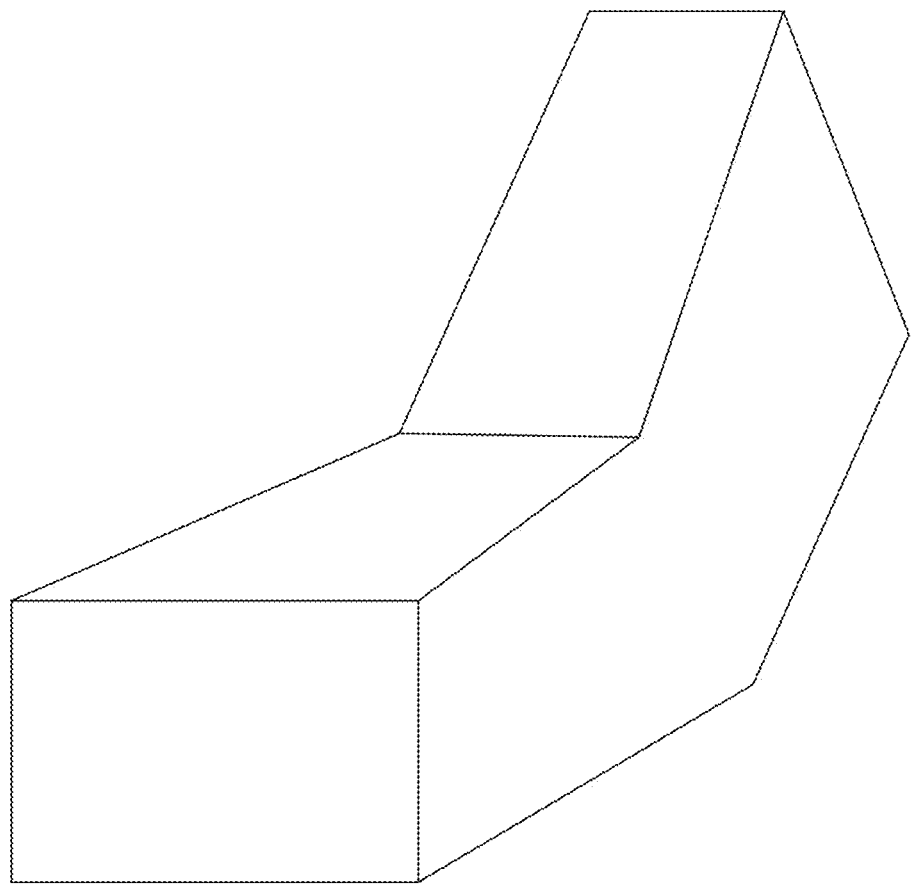

FIG. 6: A FigLeaf Brick of Randomized Shape: this figure shows a FigLeaf brick built not like a traditional brick, but as a structure of eight faces. It shows that the brick can be of any shape or size, as long as it has well defined electrode points and its material is a randomized compaction of conductance-varying materials.

Figure 7:
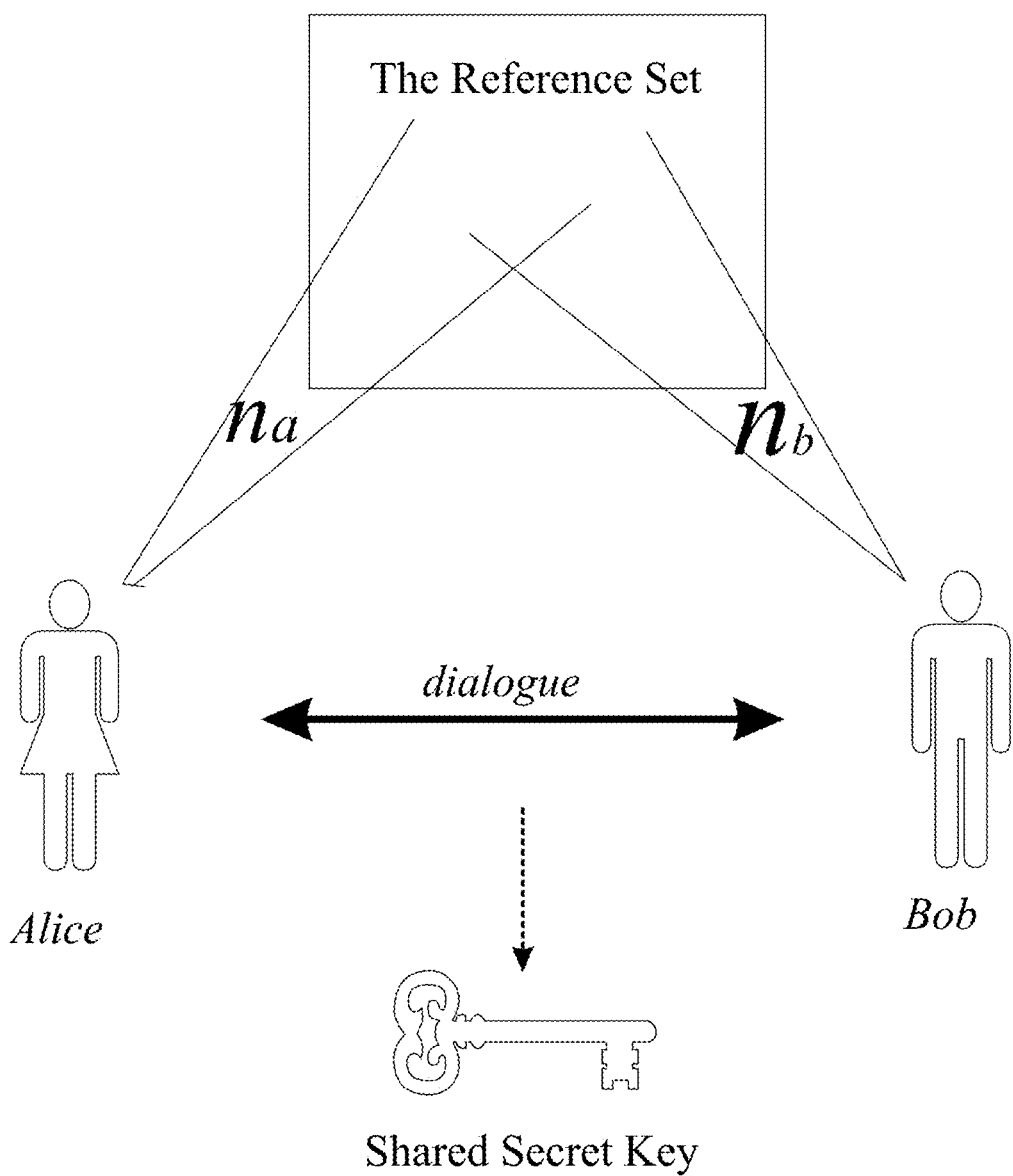

FIG. 7: FigLeaf Spontaneous Security (The Public Reference Set): this figure depicts the FigLeaf protocol: it shows a reference set from which both Alice and Bob make randomized selections of $n_a$, and $n_b$ elements respectively. A double arrow shows that after the selections were made Alice and Bob launch a dialogue that singles out the elements they have both chosen randomly, and this element becomes their private shared key (until a hacker, exposed to the reference set will catch up with them).

Figure 8:
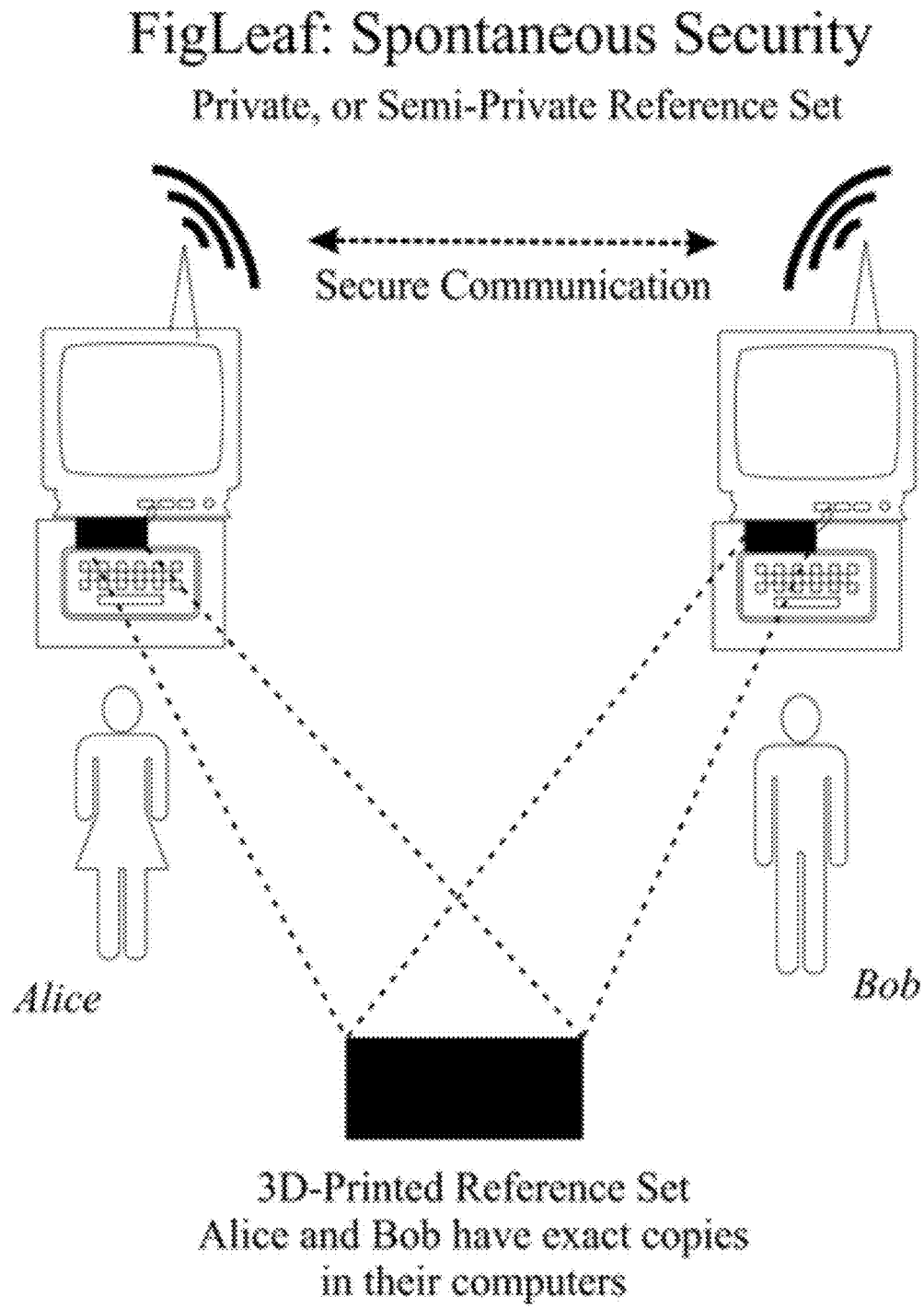

FIG. 8: FigLeaf Spontaneous Security: Private or Semi Private Reference Set: This figure shows two privacy seekers Alice and Bob, each having a physical FigLeaf "brick" in their computer, where their bricks are identical, so their measurements of currents and resistances from the corresponding electrode points are the same, and hence they can exercise the FigLeaf protocol, each over his or her FigLeaf brick.

Figure 9:
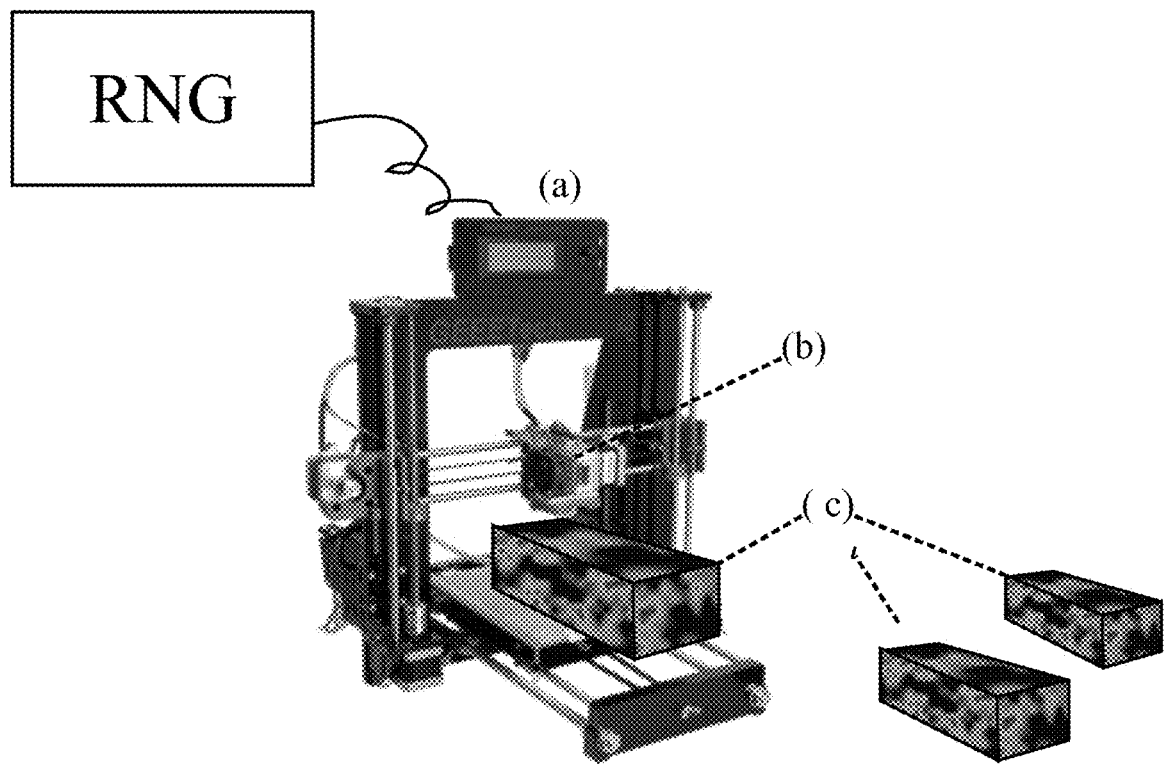

FIG. 9: 3D Printing of FigLeaf Bricks: this figure shows a 3D printer guided by a top computing device, which in turn is fed by a random number generator, so that the packing of the conductivity varying materials will be done in a fully randomized (unpredictable) way. The figure shows one FigLeaf brick just finished printing, and tow identical others printed earlier.

Figure 10:
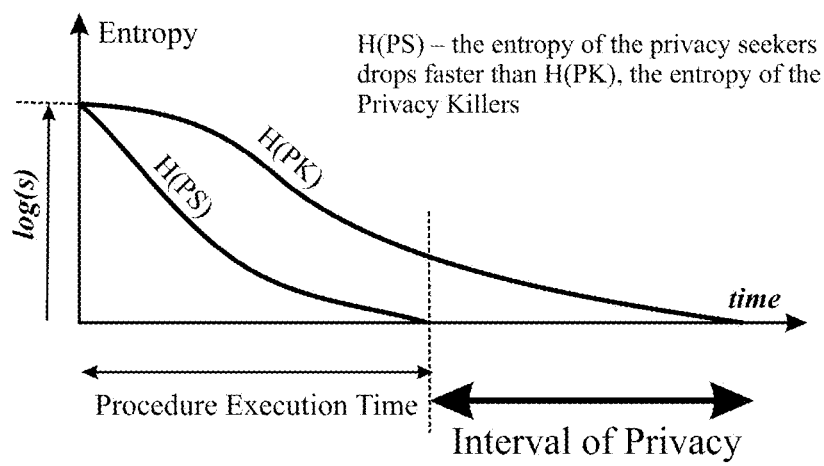

FIG. 10 Entropic Advantage Privacy Seekers over Privacy Killers

A graph showing how the entropy of the privacy seekers falls faster than the entropy of the privacy killers, reaching a point in time where the privacy seekers have no entropy, no uncertainty left, while the privacy killers still face a measure of entropy, uncertainty.

FIG. 11 FigTree

Depicting four stages of cross connecting a network through bilateral application of the FigLeaf (RABiT) protocol.

DETAILED SPECIFICATIONS OF THE INVENTION

A Method to Use Randomness Sources to Establish a Secure Communication Between Two Nodes in Cyber Space, and then Building on these Bilateral Trust Elements to Spread Trust Throughout the Network Constructing a Randomized Bilateral Trust protocol, RABiT, to achieve continuity, security, a payment platform, and track record among cyber space nodes which may be mutually unfamiliar and mutually mistrustful. The protocol exploits combinatorics principles to allow any two nodes achieve mutual trust and transaction continuity; such bilateral trust elements are pieced together to establish a fabric of trust across the network. The protocol is managed by a connectivity service provider (CSP). Applications include cyber identity management, and cyber payment. The RABiT protocol is fully randomized; it does not rely on mathematical complexity and hence is not vulnerable to cryptanalytic mathematical insight. Any vulnerability of the RABiT is fully anticipated via combinatorics calculus, and as such RABiT is ready for weaponized quantum technology attacks.

Elaboration

In the real world two strangers launch a trust-building dialogue between them, and as they learn about each other, trust emerges. In cyber space two strangers don't see each other, and the identity of one's conversation partner may change, such that a dialogue is opened between A and B, and continues between A and C, while A believes it still communicates with B. Therefore the first order of action in the online world is to insure continuity.

We claim that in the online environment (cyber space) continuity establishing dialogues must be bilateral. Let A, B, and C be three mutually blind network nodes. Let P be a protocol they share. Since they are mutually blind neither one of the three will ever be sure which of the other two has made a given statement. That is because the shared protocol P shares information among the three. Only in a bilateral protocol can one develop a trust building dialogue to insure continuity.

We further claim that network-wide trust can be established by adding up bilateral trust bonds. And therefore the solution for online identity management, as well as to online payment are rooted in a robust bilateral trust building protocol.

The RABiT Protocol

The Randomized Bilateral Trust Building Protocol (RABiT) is comprised of the following elements: (i) bilateral communicators, A and B, (ii) A Random Field, and (iii) Agent in the middle. (AIM).

These elements interact in ways explained ahead. In these explanations we use the term FigLeaf as synonymous with RABiT, and use the terms "privacy seekers" for bilateral communicators, and the term "privacy killers" for Agent in the Middle. Instead of Random Field, we used Selection Space, Randomness fountain and such like.

As the pointed out explanations highlights—RABiT is randomness based, as opposed to RSA and Diffie-Hellmann which are based on complexity.

Agent in the Middle

The two communicating nodes (also known as the privacy seekers) are carrying out their exchanges exposed to what is regarded as "privacy killers" or alternatively as "Agent in the Middle" (AiM). The AiM may be hostile, as projected from the name 'privacy killer', or it may be part of a larger context in a helpful way. In both cases the AiM is privy to the full information exchange between the communicators. In the hostile standing the AiM tries to crack the shared secret between the communicators. In the helpful standing the AiM records the exchange, the dialogue in order to provide a subsequent proof to the network that the communication took place. Such an AiM will be regarded as Verifier in the Middle (ViM).

The Random Field

There are numerous ways to build a randomized field. In addition to the options mentioned elsewhere, we point out to the Internet per se: a large, accessible, dynamic data collection. A well defined section of the Internet address space $x_1.x_2.x_3.x_4.x_5.x_6$ may be set as R. defining for every $x_i$ (I=1, 2, . . . 6) $L_i \leq x_i \leq H_i$ where $L_i$ and $H_i$ are assigned limits to $x_i$. The downloaded pages may be processed in an agreed upon fashion to extract from them a natural number Z between 0 and some high limit. This mapping may be decided ad-hoc by either one of the communicating parties.

Proof of Communication

Let A and B be two communicating nodes in some network. At time point t=0 the two have practiced a RABiT protocol before a particular Verifier-in-the-Middle (ViM), and over a random reference field R. At time point $t_i>0$, a need arises for A and B to prove that at time point t=0 they had a RABiT exchange. To do so they present the values they randomly selected from the randomized field, R, and their eventual shared secret. A doubter might suspect that these values are fraudulent, and are presented as if the RABiT communication occurred. To resolve this suspicion the communicators or others request from the ViM to expose the recorded exchange between A and B at time t=0. The ViM recorded dialogue must fit with the data presented by A and B. Otherwise fraud is suspected. One could argue that A and B could have simply invited the ViM to listen to their secret conversation, record it, and then use this recording as proof. Only that by this they expose the contents of their conversation, while with RABiT they don't.

Separately or in combination, the communicating nodes could have used a dynamic randomized field, R, where the entries change with time, but the history can be rolled back. The R-manager could verify that at time point t=0 the claimed selected values where recorded in the randomized field.

We regard the network of ViM and the custodian of R who can roll back and report its past contents as the Connectivity Service Provider (CSP).

Proof of Contact

We assume that any two nodes in some network can exercise the RABiT protocol, establish continuity, and share a secret. We can now regard the Agent-in-the-Middle as Verifier-in-the-Middle (ViM). The ViM is exposed to the dialogue between the two communicators, but not to the values they randomly selected from the randomized field. Two communicators that at some later point will claim that they exercised a RABiT protocol with one particular ViM, will be asked to expose the values they selected for the dialogue. The ViM, based on his recorded data, will be able to check out the claim. Say then that given sufficient ViMs, all bilateral contacts within a network may be able to be proven as valid occurrences. It is important to note that two cheaters who wish to claim that they had RABiT contact at some point in the past will not be able to "invent" a dialogue since they don't know what the ViM has in its memory. Also note that the ViM is aware only of the dialogue, not of the shared secret between the parties.

This then is a situation where nodes in the network may practice communication sessions, and prove them network wide.

Information Wave

Let communicators A and B practice the RABiT protocol and as a result exchange a secret S. Let now the two communicating nodes, each select another node, practice RABiT with that node and use the RABiT to pass along the original secret S. This doubles the number of nodes familiar with S. Next each node aware of S will seek another node, not yet in the loop and share S with that node. This will double the number of nodes aware of S once again. And so on. After n such rounds there will be $2^n$ nodes in the know. This is called an information wave.

Together with S, each node will pass to the next the generational count 1, 2, . . . n. After sufficient rounds all the nodes in the network will be in the know that A and B have exchanged the original secret S. If the secret S is in fact a payment between A and B, then now the entire network knows of this transaction.

RABIT Identity Management

Consider a general network in which some of the transactions are carried out via the RABiT protocol. These RABiT transactions may be registered on a public ledger, specifying that at time point t, Node $N_i$ carried out a private exchange with node N.

At any point in time, some node $N_i$ may wish to prove its identity to an examiner node E. E will check the ledger, find out a particular record involving $N_i$, and ask $N_i$ to produce the RABiT parameters of the exchange. E will then check with the appropriate ViM whether the information delivered by $N_i$ is correct. Note that ViM only knows the parameters of the RABiT dialogue, not the resultant shared secret, and not the subsequent communication. E could repeat this process for any number of RABiT communications listed for $N_i$. E will continue to check until satisfied that the node presents itself as $N_i$ is indeed this node.

If a fraudster node F will present itself as $N_i$ to E, then there will be a test (selected randomly by E) for which the result will fail, and the fraud will be exposed.

When new nodes join the network they don't have history of RABiT communication and hence will have to prove their identity by other means. For example, new nodes may be asked to pass a few RABiT transactions with the burden of proving their identity by some off line measures. As they are "primed" by some initial RABiT transactions they can keep on building their dynamic identity history.

Much of the detailed procedural description ahead relates to the AiM as an adversary who tries to steal the shared secret of the "privacy seekers", however for identity management the Agent-in-the-Middle, AIM is regarded as Verifier-in-the-Middle, ViM. ViM will be paid services which nodes will use in order to establish their identity towards the network. The communicating nodes will jointly agree on a ViM that will be given their dialogue aimed as establishing their shared secret.

In practice the ViM and the nodes will not have to keep the full details of their RABiT trust building dialogue, and instead keep a hash thereto. Any inspector node will compare the hash from the nodes and from the ViM in order to assure itself of the authenticity of the claimed secure connection.

The idea that the node that needs to decide on whether to trust a claim of another node, is the one that initiates the trust verification dialogue (and pays for it perhaps) is an alternative to the standard bitcoin solution where all the nodes essentially pay by agreeing to give the successful miner a new coin that devalues the traded currency. The bitcoin solution overtaxes the inactive nodes, which subsidize the active ones. In the RABiT solution the trust deciding node decides how much backwards to go, how many claims connections to verify, before deciding to trust the identity of a node or trust the bona fide of a payment attempt. And it is this decider-node that pays for this request to verify.

Methods of payment are a separate issue, not addressed here. There are ways to pay very small amount of money, digital cash, like offered by BitMint, which will facilitate quick exchange of money from one node to another.

Every node will pay other nodes to build trust in a transaction or in an identity of another node, but it in turn will be paid by other nodes when it is asked to help verify the identity with which it had a past session of secure communication.

Nodes which wish to transact smoothly within the network and command trust from everyone, will opt to have secure communication with as many nodes as possible, so that the trust-decider node will have many connections to choose from to verify identity. Also, such node will wish to establish secure communications with well established nodes. Because trust diffuses from nodes of high trust to nodes with which the high-trust nodes establish secure communications.

RABiT Payment

In digital money payment environments there are two issues: (i) how to verify that the transacted bits represent money, value, and (ii) how to verify that the payer is the rightful owner of the paid money. We describe a system where the two questions are separate. There may be a digital mint that mints digital money in a centralized fashion, and keeps a database of valid coins in circulation. The mint, by itself, or through delegated entities will verify the authenticity of any digital coin. We are left with the second issue.

We follow a coin X minted by the digital mint and passed on to trader $T_1$. The trader will then mark on a public ledger that coin X is in the possession of $T_1$. The identity of the trader may or may not be masked, with say, private/public pair of keys, as it is done with bitcoin. When $T_1$ passes the coin to $T_2$, then $T_2$ will mark on the public ledge the fact of this transaction, indicating that coin X now is owned by $T_2$. Suppose now a fraudster F adds in the public ledger that trader $T_2$ passed coin X to trader F. F will then try to pass the coin to trader $T_3$, relying in the fraudulent entry in the public ledger. $T_3$ will then ask F to pass to him the RABiT dialogue for the transaction $T_2 \rightarrow F$. $T_3$ will verify with the appropriate ViM that the dialogue is correct. If not, then F is exposed.

A sophisticated F might prepare himself by faking a RABiT dialogue with an accomplice, F', posing as $T_2$. This will register a RABiT dialogue $T_2 \rightarrow F$ within the data repository of some ViM, and this will fool $T_3$ to accept the payment of coin X from fraudulent F.

To defend against this fraud, $T_3$ will check on the public ledger and find that $T_2$ is registered as the owner of another coin Y, which he received from trader $T_1$. $T_3$ will now ask $T_2$ to pass to him the dialogue parameters for the Y transaction, which then $T_3$ will pass to the appropriate ViM for verification. This will defeat the fraud, except on the possibility that F' was in cahoots with another fraudster F'' and exercised a RABiT protocol over Y with him. This will be difficult since $T_2$ will be expected to be registered as owner of many coins, and $T_3$ will choose randomly for which coin to ask for the RABiT parameters.

The idea here is that it is becoming prohibitively difficult to engineer a fraud that will hold up for even a few rounds of backwards checks. The recipient of a coin will have the prerogative to decide how many backwards checks to insist on before accepting the coin as payment. The larger the value of the coin, the more tests are warranted. Fraudsters will not go to an elaborate scheme for a low denomination coin.

This scheme also identifies the identity of the traders by their history of transactions, and number of coins they own. Traders with deep history and owning a large number of coins will be more trustworthy, better known in the community. This is true whether the traders' identity is explicit or implicit via a private key.

Any trader can stop the chain of trade by redeeming the coin with the mint. The mint will be taking similar steps, and potentially check the coin history backwards to the original trader (depends on the coin denomination, and depends on other sources of relevant trust).

This solution may apply to coins with a delayed redemption time, which can nonetheless be traded. The integrity of the coin can be established by a signature of the issuing bank of mint, so that the only question is with respect to double spending, which the above solution solves.

Operational Summary

1. We describe here a method for establishing secure communication between two network nodes despite having no prior communication, and having no private communication while establishing the secure communication; and without reliance on mathematical complexity which is vulnerable to cryptanalytic mathematical insight, but rather exploiting durable combinatorics and probability principles, in particular the "Birthday Principle" which asserts that two nodes, each randomly selecting a small number of elements from the same large set of elements, have a well established chance to have selected one element in common; such that by conducting a dialogue whereby each node in turn selects one property of its selected elements and identifies to the other node all the values of this property for its selected elements, so that the other node can eliminates from its selection any element where the value of the selected property is not in the submitted list, and where that other node then reciprocates with a different node so that the original node will eliminate matching candidates much the same; this is followed by the original node selecting another, previously unused, property for which to repeat the above described process, and so the nodes take turns, and thereby the list of candidates for a common element is narrowed down for both nodes until either it is evident that no match is found, in which case the process repeats, or a match is found, and it becomes a shared secret known only to the these two nodes; this randomness based bilateral trust building procedure (RABiT) can be embedded in every device on a network to improve network performance by building trust from the ground up, namely from bilateral connection and up; such trust can be used to (i) facilitate payment, (ii) establish online identity, and (iii) in general to combat fraud and repel attacks on the integrity of the network.

2. We also describe here a method as in (1) where the dialogue used to establish mutual private secret is being registered by an Agent-in-the-Middle (AiM) who logs the dialogue but does not share the bilateral secret; the respective nodes can then prove their private secret exchange by exposing their selected entities as in (1), and having AiM reveal the dialogue identifying the time when it was logged. Combined this data proves the fact and the time of the secure communication between the communicating nodes.

3. We further describe here a method as in (1) where a node establishes its dynamic identity by proving as in (2) a set of connections with other nodes, such connections may be posted on a public ledger, and the right node will be able to prove that it was the node that carried out each connection identified for it on the public ledger.

4. Next we describe a method as in (1) where the RABiT protocol is used for one node to pass a digital coin or any token to another coin, and this transaction is then recorded on a public ledger such that the public ledger at any moment will identify the current owner of each digital coin or token, and where the current owner of a coin may pass the digital coin or token to a prospective new node owner, where the prospective owner may verify the fact that the payer node currently owns the digital coin or token by asking the current owner to expose the RABiT dialogue used by it to receive that digital coin or token from the prior owner, and if the current owner proves a proper RABiT transfer dialogue from its former owner, then the prospective owner may further request for the prior transaction of same digital coin or token to be exposed and thereby proven, as in (2), and so on, as backwards as desired, because every such proof makes the probability of fraud diminish further and further.

Ahead we present a detailed description and mathematical explanation of the methods and protocols described above.

Mathematical and Operational Elaboration

Walking around in cyber space data naked, seeking fig leaves to cover our private affairs, we today rely on various mathematical-complexity solutions, which provide a false sense of protection. The big cryptanalytic juggernauts wish us to trust these public/private key pairs, so we hide our deepest secrets with them, which those data hunters then violate. We propose to take a different route to establish privacy in an otherwise privacy-free zone: randomized spontaneous security. Our focus is on first securing a temporary secret, that may have a short life span, but of sufficient length to either accomplish the private transaction (e.g. payment), or to enable the privacy seekers to leverage it to an enduring secret. The temporary secret is achieved by allowing the privacy seekers to each randomly select a small subset of a sufficiently larger set of data elements (the entropic set), and then exercise a dialogue that allows them to indirectly determine whether they have randomly picked a shared element. The privacy seekers will repeat this procedure until they succeed—using this shared element as their temporary secret until the "privacy killer" catches up. The shorter the required life span of the temporary privacy, the easier and faster the computation. The protocol may be exercised with only basic computing power, which offers implementation flexibility. The reference set used in the FigLeaf protocol may be a set of mathematical construct, a designated data base, or a physical set.

1.0 Introduction

What is the weakness of the current approach? It relies on unproven algorithmic intractability. And since there is no mathematical proof that the deployed algorithm is useful for its declared purpose, the reliance shifts to the next-best-thing: preponderance of evidence. The fact that an ever-larger number of attempts to pierce the conjectured intractability, have all failed is a "strong indication" that this intractability is effective. Mathematicians abhor such logic, pointing to countless counter examples, like the Mersenne conjecture for primes of the form $2^n-1$. Yet, absence of proof, we all surrender to relying on that preponderance of evidence. And this reliance creates a gravitation process, where all users choose the one or few algorithms, which are most popular, since they have attracted more attackers, (without a published success), and hence are protected by more preponderance of evidence. This popularity of very few algorithms creates very valuable stationary targets for cryptographic adversaries: they have one or few algorithms to crack, and a strong incentive to hide the state of progress in cracking those few very popular algorithms. As a result the user community operates under the shadow of suspicion that some cryptographic adversaries have already cracked the algorithms we use and assume intractable, and they exploit this feat with sufficient caution to deny any strong evidence that this is the case.

To remedy this vulnerability we may want to opt for mounting intractability through ad-hoc, random ingredients. Such intractability will deny any crypto adversary the option to dig, research and prepare for attack beforehand.

2.0 Entropic Advantage: A Theoretical Framework for Privacy and Security in a Hostile Environment We concern ourselves with the following challenge: two or more parties with no shared communication history of record wish to establish a shared secret through a communication protocol that is carried out in complete visibility towards the party against which the secret is desired.

We designate the parties that wish to establish a mutual secret as the "privacy seekers" or PS, and the party against which the secret is being established as the "privacy killer", or PK.

We propose for the PS to establish a visible set of s elements, such that each element is associated with a data item. We designate this set as the "Entropy Set" (ES). The PS will wish to designate one element in the ES as their shared secret. To that end the PS will operate on the ES, communicate about their operation for the purpose of creating an entropic advantage against the privacy killer.

We define "entropic advantage" in this context as follows: At any moment in time, t, each party assumes an entropy measurement of the question: which of the s elements in ES is the secret shared by the privacy-seekers (PS), if any?

$$H_x(t) = -\sum_{i=1}^{s} p_{ix}(t)\log(p_{ix}(t))$$

were $p_{ix}(t)$ is the probability rating held by party x at time t, that item i in ES is the shared secret.

We define the entropy of the PS: $H_{ps}(t)$ as the sum of the entropies of all the privacy seekers at time t. Accordingly, the entropy advantage experienced by the PS over the PK, EA(t), at time t is defined as:

$$EA(t) = \frac{H_{pk}(t)+1}{H_{ps}(t)+1} - 1$$

Where $H_{pk}(t)$ is the entropy of the privacy killer with the respect to the same question. It is easy to see that should the PS determine at time t, with certainty that one element in ES is their shared secret then $EA(t)=H_{pk}(t)$, and in the case where: $H_{pk}(t)=H_{ps}(t)$, $EA(t)=0$.

As soon as the ES is defined, (t=0), we have:

$$H_{pk}(t=0)=H_{ps}(t=0)=\log(s)$$

For the PS to secure their desired secret at some time point $t_s$ they will have to reach a point of time $t_s$ characterized by:

$$H_{ps}(t=t_s)=0 \text{ and } H_{pk}(t=t_s)>0.$$

Hence to achieve their desired objective the PS will have to devise a communication protocol resulting in entropy decline for the PS in a greater pace then it would decline for the PK. In other words, to secure their shared secret the PS will have to achieve an entropic advantage defined as:

$$H_{ps}(t)<H_{pk}(t) \text{ for some values of } t: 0 \leq t \leq t_s$$

We now concern ourselves with the challenge to effect an entropic advantage for the PS over the PK. Since the entropy reduction protocol is carried out in complete visibility towards PK, it is a natural question to ask: is it theoretically possible?

Since all the information that flows from anyone to anyone is visible to everyone, the only way to build a discriminatory entropy is to maintain a discriminatory knowledge of relevance. At the instant when the ES is defined, all parties have equal knowledge of it, and share the entropy measure $$H_{ES} = -\sum_{ES} \frac{1}{s} \log\left(\frac{1}{s}\right) = \log(s).$$

There is a way for players to carve out an entropic distinction, and that is by taking actions and not communicating them, at least not directly. Such action is to randomly pick a subset of the ES. Each player so picking will have its own picks, over which each player can communicate, and owing to this communication achieve a unique measure of $H_E$s. Once so, it is theoretically possible for the PS to achieve a temporary entropic advantage at some point, over the PK. And that is because of what the PS know, and the PK knows not, and hence their entropic measure with respect to the possibility of each element in ES being a shared PS secret is different for the PK versus the PS. Note that this conclusion is independent of the computing power of the parties.

This answer leads directly to a second question: can the PS secure a permanent entropic advantage? In other words, can the PS achieve a zero entropy state for themselves, while insuring some residual non zero positive entropy for the PK?

Here we offer a conjecture that a permanent entropic advantage is impossible. We will prove it ahead with respect to a particular algorithm discussed here: the FigLeaf solution. Yet, the general question remains open.

Any temporary entropic advantage may be extended indefinitely. A temporary secret may be used to encrypt data for another round of the same procedure, and the new secret may be used for yet another round. And so ad-infinitum. The PK will keep chasing the latest PS secret, but the PS will have to keep "pumping" to maintain the secrecy state.

Concluding that an entropic advantage is always possible, but that it is always temporary, one is confronted by the third natural question: duration. How long can an entropic advantage last?

The answer to this question clearly depends on the computing power of the parties involved, so it may be extremely short, or quite long or any measure in between.

The fourth question that comes forth is: how long is long enough?

The answer depends on the purpose for which the privacy is sought for. For certain purposes a very short interval of privacy is sufficient, for others the temporary privacy will have to be leveraged to secure a permanent privacy and security.

The following graph depicts the entropic advantage process in its generic form. Ahead, we will discuss a particular protocol to implement it: the FigLeaf Protocol. See FIG. 10.

3.0 the FigLeaf Protocol

The FigLeaf protocol proposes to achieve an entropic advantage by calling for all the privacy seekers to randomly pick a subset of the entropic set, (a "pick list"), and then communicate among themselves for the purpose of ascertaining whether by chance they all have one element of the ES in common, within their respective pick lists. And if they do, regard this element as their temporary shared secret, and if they don't, to return to the former step where each PS picks a random subset of the ES. Each PS knows which elements it picked and that internal knowledge discriminates between the PS parties and the PK. It is this discrimination that is the basis of the efficacy of the FigLeaf protocol.

The key to the FigLeaf protocol is the challenge for the PS to communicate to each other information regarding the elements they randomly picked (their pick-list) such that they will be able to mutually shrink their ES entropy, faster than the PK. The way the FigLeaf protocol proposes to do it is to take advantage of the fact that every physical element (in case the ES is physical), and every abstract element (in case the ES is abstract) may be characterized by infinite number of properties: $p_1, p_2, \ldots \infty$. where each property j comes with a respective range of possible values $r_j$. Each element i ($1 \le i \le s$) in the ES may be associated with any number t of properties. Let $v_{ij}$ specify the value of property j for $1 \le j \le t$ associated with element i ($1 \le i \le s$).

The selected properties must be 'readily computable'. Let $d_i$ be the data associated with element i∈S, then the computation: $d_i \to v_{ij}$ to compute the value of property j for element i, will be sufficiently fast, not to choke the procedure with overbearing computation. The function that performs this computation should be a "weak one way function" (WOWF): a function for which the pre-image requires substantially more computation than the pass forward. While a regular one-way function (OWF) requires infeasibility of reverse computation, a WOWF will only require that the computational burden backwards is considerably greater than the computational burden forward. The FigLeaf protocol just has to insure that direct computation of preimage is more difficult then scouring the ES for it. There is obvious less doubt as to the existence of WOWF than to proper OWF. Anyway, it is a fundamental requirement of the FigLeaf protocol that WOWF do exist, and that there are plenty of them.

The fundamental lemma of the FigLeaf protocol: for i≠j, two elements $T_i, T_j \in ES$, there exists a property $p_t$ such that $v_{it} \ne v_{jt}$.

Proof Any two distinct elements, which share the values of all their properties cannot be established as distinct one from the other. Hence, if they are known as distinct they must have at least one property t for which $v_{it} \ne v_{jt}$.

Let X and Y be two elements of ES (X, Y∈ES). Let X and Y share the values of t properties: $v_{xi} = v_{yi}$ for i=1, 2, . . . t. We can write then:

$$\Pr[X=Y] \to 1 \text{ for } t \to \infty.$$

Namely, the more properties the elements have in common, the greater the chance for these elements to be one and the same. We regard this as the statistical determination of identity.

We can also state the obvious: if there exists a property $p_t$; such that $v_{xk} \ne v_{yk}$, then X≠Y.

Based on the above two premises, two PS, each holding a randomly picked element of ES will be able to steadily decrease the entropy over the question of whether they hold the same element, by comparing the values of more and more properties of their respective elements. This is called the property-based entropy reduction process.

In the case where the two PS hold the same element in ES, then, no matter how many properties they will compare values for, there will be not a single disagreement.

Based on the above premises we can state the following: Alice and Bob, two privacy seekers, randomly pick an element form the ES, elements A and B respectively. Alice and Bob then select t properties shared by all elements in the ES, and compare $v_{ai} = ? v_{bi}$ for i=1, 2, . . . t. Applying the statistical determination of identity, Alice and Bob will increase their confidence in the proposition that they both hold the same element (A=B) as the value of t increases.

Since the PS determine the ES, and they also determine the properties they evaluate, they are fully aware of the size of ES, (s), as well as the range of values $r_i$ associated with every property $p_1$. Alice and Bob will further restrict themselves to properties, which are uniformly distributed. Hence the probability for any arbitrary value of property i for element j is $1/r_j$, for all combinations of i=1, 2, ... t and j=1, 2, ... s. This restriction will allow Alice and Bob to compute the likelihood for both of them to hold the same element (namely A=B) as:

$$Pr[A = B] = 1 - \prod_{i=1}^{t} \frac{1}{r_i}$$

As Alice and Bob check more and more properties they eventually reach a point (a t value) where they are both sufficiently convinced that they hold the same element in ES.

Since the ranges of the selected properties is known to the PK, it too will be able to compute the chance of Pr[A=B] and be equally convinced of the proposition that Alice and Bob hold the same element.

The critical difference between the PS and the PK is that the PS know the identity of the element they each hold, while the PK does not. This holds for the moment where the probability of Pr[A=B] reached the convincing level. And it is that gap in knowledge that is the foundation of the FigLeaf protocol.

The Temporary Entropic Advantage Theorem: the knowledge advantage established for any PS over the PK is temporary. Given the values of the t properties which convinced the PS that they hold the same element, the PK will eventually be able to check all the elements in the ES, and find the identity of the shared element with the very same degree of confidence that served the PS.

Proof. Suppose the PK checks the ES and concludes that there are two elements X, and Y that are associated with the values of the t properties checked by the PS. Namely: $v_{xi}=v_{yi}=v_{ai}=v_{bi}$ for every property i=1, 2, ... t. The PK will then end up with terminal equivocation over the identity of the shared element held by the PS. However, in that case the PS will also have to wonder: perhaps X=A≠B=Y? Since both Alice and Bob pick their element randomly, there is an equal chance for the following possibilities: [A=X, B=X], [A=X, B=Y], [A=Y, B=Y], [A=Y, B=X]. Which means that there is 50% chance that Alice and Bob do not hold the same element. And hence, given that Alice and Bob are statistically sure that A=B, it is necessary that X=Y, which means that when the PK finishes checking the entire ES, it too will know, and with the same confidence, the identity of the shared element held by Alice and Bob. In other words—no residual entropy can be planned using the FigLeaf protocol.

What is possible, though, is to modify this basic practice in order to increase the interval of privacy (IoP) which is the time interval between the moment when the PS identify their mutual secret, and the point when the PK catches up.

We shall limit our discussion to two privacy seekers, since any larger group can eventually share a secret by repeat invocation of the bilateral secret sharing.

We choose to introduce the approach and the methodology by first presenting a simple configuration, and later building upon it.

4.0 the Basic Entropic FigLeaf Configuration

The privacy seekers plan to exercise a procedure which will give them an entropic advantage over a privacy-killer who is exposed to anything the privacy seekers are sending each other. The Privacy seekers then decide to each randomly pick an element from the Entropic Set, (ES), then communicate with each other for the purpose of determining whether or not they have picked by chance the same element in the ES. We designate this exchange as the match dialogue. The match dialogue will not explicitly identify the items each of the privacy seekers selected. When the match dialogue is concluded the privacy seekers have realized whether or not they picked the same item in the ES. If they did, the procedure is over. The privacy seekers share a secret—the identity or the data content, of the mutually picked element, and that information is a secret that eludes the privacy killer for some period of time. We say then that the privacy seekers have secured their privacy, albeit for a short time until the privacy killer will catch up. If the match dialogue concludes with the determination that the privacy seekers have not picked the same element then, they will each pick out another element in the ES, again randomly, and so continue until they randomly pick the same element.

We can write:

$$FL(ES) \to d$$

where FL is the entropic fig leaves procedure, operating on the ES to generate a shared secret, d, for the privacy seekers.

Since the PS cannot explicitly identify the picked element without undermining their purpose, they need to refer to it and communicate its identity based on some derived property. Let p be a property of each of the s elements in the ES. Let the range of possible values for p be r. Let the value of p for elements in the ES be a uniform distribution, i.e: the probability for the value of p to be an arbitrary value p=v, be 1/r for every element s in S, for every v in the r range. The property p is computed from the value, v of the picked element, d, of the ES via a dedicated weak one-way function, so that the privacy killer will face a computation effort requiring $\theta_b$ time units to reverse compute p→d, and $\theta_b$ is sufficiently large.

The following is clear with regard to the collision probability—the probability for two elements in S to share the same value of p:

$$Pr_{collision}[s/r \to 0] = 0$$

where $Pr_{collision}$ is the probability that S will have two or more elements sharing the same value for property p.

We shall now calculate the effort to achieve a match. It will be based on the expected number of random-picks, Exp(# of trials). It is by definition the summation of all the possible number of trials, each multiplied by its chance to happen.

Let $PS_1$ made it choice, X. The chance for $PS_2$ to hit on X after i trials is:

$$Pr[\text{hit at trial } i] = \left(\frac{s-1}{s}\right)^{(i-1)} * \frac{1}{s}$$

And hence:

$$Exp[\text{\# of trials}] = \sum_{i=1}^{\infty} i * \left(\frac{s-1}{s}\right)^{(i-1)} * \frac{1}{s}$$

We can multiply this equation by (s−1)/s:

$$\frac{s-1}{s}\text{Exp}[\# \text{ of trials}] = \sum_{i=1}^{\infty} i\left(\frac{s-1}{s}\right)^i * \frac{1}{s}$$

Subtracting the former equation from the latter, generates a geometric series which evaluates to Exp(# of trials)=s.

Let θ be the time needed for the privacy seekers to each evaluate the value of property p of a picked element in S. Then the time needed for the privacy seekers to find a match in S will be: θs.

Let α be the computational advantage the privacy killer has over the privacy seekers. That means that the privacy killer requires αθ time units to compute the value of a property p of an element in S.

On average the privacy-killer (PK) will need to evaluate the value of p for s/2 elements in S, spending on average αθs/2 time units to do so. On the successful match the privacy seekers (PS) spend 1θ to determine the match, so on a match situation the PS secure an interval of privacy (IoP):

IoP=αθs/2−θ=θ(αs/2−1)

Two out of the variables in the IoP equation are under the control of the privacy seekers: they can choose a property p to fit into a desired θ value, and choose the size of S(=s) at will. IoP is the time available for the PS to either accomplish the objective for which they have sought privacy, or to exercise a leveraging procedure to leverage the IoP to a more extended privacy.

While the PS may completely control the IoP, and make it as large as desired, the cost for doing so may be prohibitive. Since the expected number of trials before a match is s, then the time spent on the procedure will be, on average PET=θs, PET="Procedure Execution Time". If the PS and the PK have comparable computing power (namely α=1) then PET is roughly double the IoP: PET=2*IOP (α=1). So, if the PS require an interval of privacy of 10 minutes, they will have to invest 20 minutes in carrying out their procedure. For certain applications (like money transaction) the required IoP may be very short, say 5 seconds, and in that case the entropic advantage procedure will take a reasonable 10 seconds.

For this procedure to work, it is necessary to use either a new ES, or a new set of properties (or both) each time it is initiated, otherwise the PK will evaluate S with p before the procedure is carried out, and the IoP will shrink below its efficacy levels.

4.1 Illustration

Let us define an entropic set, ES, comprised of s elements, as the number from a starting value L, to a final value H=L+s. The identity (label) of each element is the same as its content: its value, v (L≤d≤H). We can define a family of useful properties as follows: A selected property p will be structured:

$v = d^{g+1} \text{ MOD } r$ where v is the value of property p for element of value d, r is the range of values for p: 0≤v≤r, and g can be defined ad-hoc as the number of prime numbers that serve as factors for v, and are found within the interval $L_p$ and $H_p$ (two integers). The values of $L_p$ and $H_p$ determines the value of 0, the computation time for a given v. r can be set so that: s<<r.

Checking out with a set of numbers: let s=1000, L=6000, H=7000, r=50000, $L_p$=10 and $H_p$=20. Let 0=500 milisec.

Alice, one of the privacy seekers randomly selects a number between {6000:7000}:d=6721. She computes its factors: 6721=11*13*223. She counts two factors between 10:20, so she computes p as:

$v(d=6721)=6721^3 \text{ MOD } 50000=43361$

Alice communicates v to Bob, her privacy-seeking companion, and if he computes the same v value, they assume they have by chance selected the same number. Otherwise they both try again and again until they randomly pick the same number as indicated by the value of the property p. The expected number of tries is s=1000, so the privacy seekers are expected to spend 1000*500=500 sec. Assuming a=0.1 they will secure an interval of privacy (IoP=0.5*500*0.1−1=24 seconds. The privacy seekers using this basic protocol will secure 24 seconds of privacy at the cost of 500 seconds of exercising the FigLeaf procedure. Not a very appealing prospect. But help is on the way.

5.0 the "Birthday" Version of the Entropic FigLeaf Procedure

Considering a comparison with the prevailing algorithmic-complexity solutions the FigLeaf solution suffers from a practical shortcoming—the very long and burdensome effort to practice it for an ES of size s that is large enough to offer a useful interval of privacy (IoP). This focuses the innovation effort on shrinking the procedure execution time (PET). The idea: to let the privacy seekers, select more than one element in S, and then carry out a match determination procedure to determine if the two or more sets of randomly picked items by the privacy seekers will include a match.

This idea is especially attractive because of the well-known "birthday effect"—the unintuitive result that the chances for a match increase very fast as the size of the picked sets (the "pick lists") is increasing, even a little. And for larger entropy sets, the ratio between the picked elements to the size of the ES, is getting smaller fast, while maintaining the same chance for a math.

Given a set ES comprised of s items, and allowing Alice to secretly and randomly pick $n_a$ items from S, while allowing Bob to pick $n_b$ items from the same ES, also secretly and randomly, then the chance for Alice and Bob to have at least one matching pick is given by:

$$Pr[\text{match} = \text{yes}] = 1 - \frac{(s-n_a)!(s-n_b)!}{(s-n_a-n_b)!s!}$$

The formula is built as follows: let Alice pick her $n_a$ elements in S. Bob will then pick his first element. The chance for his pick, not to coincide with any of Alice's picks is: $(s-n_a)/s$. Bob will then pick his second choice out of a field of s−1 elements, and the chance for his second pick not to coincide with any of Alice's picks is: $(s-n_a-1)/(s-1)$, and similarly for Bob's i-th pick: $(s-n_a-i+1)/(s-i+1)$. The chance for not hitting an Alice pick by any of Bob's $n_b$ picks is the multiplication of the individual chances, and the chance for a match is the complement to one of the chance not to match.

The results are counter intuitive. For |ES|=s=1,000,000 and for $n_a=n_b=n$ we have:

| Entropy Set: 1,000,000 elements | |
| --- | --- |
| n | Pr[match = yes] |
| 100 | 0.009 |
| 250 | 0.06 |
| 500 | 0.22 |
| 750 | 0.43 |
| 1000 | 0.63 |
| 1500 | 0.89 |
| 2500 | 0.99 |

The results indicate that picking each 1000 elements out of a set of 1,000,000 elements the privacy seekers will have a 63% chance to have a match. Which means that on 1.58 tries on average, they will have a match.

The task ahead is for the PS to determine (i) do they have a match? and (ii) what is it?

5.1 Match Determination Procedure

The easy case is $n_a=n_b=1$: We consider weak one way function (WOWF) associated with a large range of uniformly distributed values, $r_0$ in count, computing a property $p_0$. For an entropic set, ES, counting s element where $s \ll r_0$, the PS will be quite sure that if their picked element has the same property value then they have their match. The PK will be equally certain that a match was found, but unlike the PS, the PK will have no knowledge as to which element it is; and will have to test, on average, s/2 elements. And that is why this procedure is guaranteed to offer its users a certain Interval of Privacy (IoP).

We now consider the case of $n_a=n_b>1$. By selecting $s \ll r_0$ as before, the PS will be sure that if they have a match for the value of some property, then they have the right element match. The problem for n>1 is to know which of the candidates is the match. The PS may resolve this question, by each picking a different OWF and disclosing the corresponding property values. Regardless of the value of n, there is likely only one match, and each PS will be in the know about it; leaving the PK in the dark—for a while.

There are some 'tricks' that can be applied by the PS to boost the interval of privacy. For example: the PS may decide to run the procedure some k times. And then take the match candidate of the last round where a match was found. If no match is found in k round, then another set of k rounds is tried. The PK will not know which of the k applications of the FigLeaf procedure harvested the applied match. So the PK will have to try them all. And for all the failed rounds the PK will have to test the full s elements in ES. Hence, while the PS increased its workload k times, the IoP was increased 2k times.

We now consider a series of t WOWFs associated with ranges: $r_1, r_2, \ldots r_t$, such that $r_i < s$ for i=1, 2, . . . t. Each $r_i$ represents the value range for property $p_1$.

Let:

$$\prod_{i=1}^{i=t} r_i = r_0$$

Accordingly, an element of ES that features a particular list of values for some t properties: $p_1, p_2, \ldots p_t$, will appear with the same frequency as an element featured with a specific value for property $p_0$ which has a range of $r_0$.

This is because a random element in ES with a designated property for $p_1$ will appear in a frequency of $1/r_i$. And an element which satisfies particular values for $p_1, p_2, \ldots p_t$ will appear in frequency: $\Pr[p_1, p_2, \ldots p_t] = \pi(1/r_i)$ for i=1 to i=t, which is equal to $1/r_0$.

This gives the privacy seekers the flexibility to gradually reduce the candidates' list by applying high frequency properties (properties with low range) one by one, monitor how effective they are in decreasing the number of match candidates.

To illustrate: let the entropy set ES be comprised of s=1,000,000 elements. Let Alice and Bob, the privacy seekers, each pick $n=n_a=n_b=1000$ elements. Their chance to include a match is 63% so that in less than two attempts, on average, they will net a match. Using a series of OWFs with small result ranges, Alice sifted out 900 elements from the original 1000 (remaining with 100 candidates), and Bob shook off 910 elements, resulting with 90 members in his match candidates' list. The PS will now analyze their remaining candidates with a $OWF^h$ resulting in range $r_h$. The OWF is selected to require a forward computational burden of 0.5 sec per element. Bob will be spending 0.5*90=45 seconds on analyzing his candidate list, and Alice will spend a little less. The PK will have to evaluate ES for the low-range properties, resulting in a similar proportion, namely 100,000 candidates. Each of which will have to be evaluated with the 'hard to compute' $WOF^r$: 100,000*0.5=50,000 second, almost 13.9 hours to analyze the situation to exhaustion, (assuming a=1).

This illustration highlights the advantage of sorting out the candidate list via a series of distinct WOWF, such that when the list of candidates is getting smaller the PS may opt for OWF which are tedious to compute forward ("Zero Way Functions"—ZWF) to increase the efficacy of the FigLeaf protocol.

The privacy seekers are in control of the entropy set, their pick-list, and the properties, and the one way functions they use. This provides a wealth of parameters that should be optimized according to the specific needs of the privacy seekers.

5.2 "Taking Turns" Protocol

Alice and Bob, the privacy seekers, may take turns in choosing properties, and the OWF that evaluate them. Alice may choose her first OWF, computing the value of property $p_1$, with range $r_1$, and sending these values off to Bob. Bob will then eliminate the elements in his pick-list for which the value of property $p_1$ is not in Alice's list. This will allow Bob to decrease his match-candidate list from $n=n_b$ to $n_{b1}$.

Since $n_{b1} < n=n_a$, it will be more effective to let Bob pick the next OWF, to compute the second property $p_2$, and then send over to Alice all the values of this property in his list. This will allow Alice to eliminate all the items in her pick-list for which the value of $p_2$ is not in Bob's list. As a result Alice's match candidate list will shrink from from $n=n_a$ to $n_{a2}$.

At this point the situation between Alice and Bob is the same as it was to begin with (after they both made their picks), except their respective candidate's list is smaller. For Alice it was $n \to n_{a2}$, and for Bob $n \to n_{b1}$. Another difference is that the two used OWF cannot be used again.

Alice will choose a third OWF ($OWF^3$), to compute property $p_3$ for its match-candidate list, and pass the list to Bob. Bob will then be able to eliminate any of his candidates for which the value of $p_3$ is not in Alice's list. Bob candidate list will then shrink: $n_{b1} \to n_{b3}$. It would now be Bob's turn to pick a 4th OWF, $OWF^4$, compute the values of the corresponding $p_4$ for all its candidates, and send the list to Alice. Alice will then eliminate from her candidate-match list all the items for which the value of $p_4$ does not show in Bob's list. Her list will then shrink $n_{a2} \rightarrow n_{a4}$.

This back and forth protocol will continue until either one of the PS ends up with an empty candidate list, or with a single candidate. In the former case, the two pick-lists do not have a match, and the FigLeaf procedure needs to be played again. In the latter case the remaining candidate is the likely shared candidate.

Alice and Bob will be able to verify their shared element of ES by either one of them picking a "verification property", $p_v$, with a very large uniform range $r_v \gg s$. A match for the value of $p_v$ will verify the candidate.

While this will surely work, it will also leak to the PK that the match is the pre-image of $p_v$. It is therefore that the verification OWF should be especially strong, and even, a so called, "Zero Way Function"—namely a function that poses an intractable challenge for reverse computing, but also poses a considerable computational challenge for the forward computing. The PS have to compute one instance of the verification function, so it would not be to foreboding for the computation to be heavy. By contrast, the PK will have to go through the remaining candidates in the entropic set.

The PS may choose the various OWF per their forward computational load, in proportion to the current size of their candidates-list. When the list is large (close to the original pick-list), the computational burden to compute the properties should be small, because the PS need to compute many instances. As the candidate-list shrinks, the computational load of the chosen OWF may increase because there are fewer instances to go through. The PS may take note that the greater the forward computational load of a OWF, the greater the secured interval of privacy.

The range of the OWFs may be $2 \leq r < \infty$. The choice of $r=2$ is not practical because the candidate list will likely include both values. For a sufficiently large range, one OWF will identify the match, if there is one, and determine that there is none, if that is the case. We have seen that a single large range OWF may be replaced by a series of low-range OWF, allowing the PS the flexibility to choose OWF of different forward and backward computational burden.

Normally the size of the pick-lists for the two privacy seekers will be the same. However in the case where there is a great difference in computing capacity between the parties then the stronger party may use a larger pick list than its counterpart.

6.0 Use

First let's identify non-use cases. ecommerce today relies on algorithmic-complexity protocols to establish a private communication channel between two strangers in cyber space. These algorithms, as discussed, may have been secretly compromised. However, it is not likely that common financial fraudsters would know about it, without this becoming public knowledge. That means that small online purchases are OK with the current solutions. However, when the threat comes from a nation-state, or a large sophisticated organization then the FigLeaf solution rises to become a viable secure alternative.

Unlike the algorithmic-complexity solutions, the FigLeaf privacy solution is flexible as to its burden: the choice of the relevant parameters is flexible, and so is the computational load. This gives its user the flexibility to apply it with extreme security (but with more effort to practice it), or with minimal security, for which there are numerous use cases.

The fact that FigLeaf is exercised with choice of OWF, allows its user to practice it with functions that do not require complex computations. The FigLeaf requirements of the selected OWF is uniformity, range specificity, and a threshold burden for reverse computation. There are plenty of simple functions that comply. This makes the FigLeaf protocol attractive for the Internet of Things (IoT) where the devices may be operating with simplified computing power.

6.1 the Randomness Fountain

A standard trusted way for privacy seekers to leverage their temporary privacy into a permanent one is to use a 'fountain of randomness'.

A fountain of randomness is a globally accessible source of high quality randomness flowing at a pace that allows two privacy seekers to use a temporary secret to both read the same chunk of randomness off the fountain, while disallowing the privacy killer who comes later from reading the same chunk. This will happen if the fountain will offer accessible randomness at various changing rates, and at such large quantities that it would be infeasible for anyone, including the fountain operator, to keep a searchable memory of past randomness displayed by the fountain. This will allow the privacy seekers to use their temporary secret to identify a common location in the randomness field, so they both read the same randomness—to become their permanent address. That shared randomness will be erased and replaced several times before the respective privacy killer finds out where to look.

The challenge of leveraging a temporary secret to a permanent one may be satisfactorily addressed by having one privacy-seeker create a random sequence content in a random network address simultaneously with establishing (or shortly before) the temporary secret is secured. No sooner does the second privacy seeker signal that it accessed that address and copied its random content, does the first privacy seeker erase that content, which will now serve as the permanent secret serving the two privacy seekers.

6.2 Exploiting Pre-Shared Bits

Quantum entanglement technology comes 'knocking'. The challenge of keeping entangled sub-atomic particles coherent is gradually being negotiated. It is becoming a reasonable expectation that privacy seekers will be able to receive entangled particles from a third party, or from either party, such that they will have a shared secret unknown to the privacy killer. The number of such shared bits of private information may be too small. So any such shared bits can be interwoven to the FigLeaf protocol—enhance it at any level of shared secret bits.

The simple way to interject entangled bits into FigLeaf is to cut the ES to a smaller set of size $ES/2^q$, where q is the number of shared qubits. This shrinking of the ES will only be known to the privacy-seekers, and not to the privacy killer. The impact will be that either the pick-list will be smaller, or the chances for a match will be greater. In either case the FigLeaf procedure will become faster. Fort example, let $|ES|=s=100,000,000$. The regular FigLeaf procedure use with $n_a=n_b=10,000$ would have a 63% chance to have a match. Applied with one shared qubit, the size of ES will be 50,000,000 for the PS, and the chance for a match will rise to 86%. With 2 qubits to share, the effective size of the ES will drop to 25,000,000, and the chance for a match will rise to 98%.

6.3 Physical FigLeaf Implementation

The ES may be a collection of mathematical constructs, but it may also be a collection of physical elements. Each physical element may be associated with any number of properties, for which well-defined measurements do exist. Such properties may be associated with a well-defined value range, and a well known degree of effort to carry measure them. That is all that is needed for a physical implementation of the FigLeaf procedure. The PS will be both equipped with a matching FigLeaf contraption, choose measurements in random, and exchange measurement results in order to zero in on a shared secret. The great advantage of the physical FigLeaf is that only holders of the physical device can crack it. And if the device requires advanced manufacturing capability then the circle of threat may be quite limited.

We discuss physical FigLeaf options:

Electro Magnetic FigLeafs

Electro Magnetic Thermodynamic FigLeafs

Chemical Electro Magnetic Thermodynamic FigLeafs

The ES may be comprised of a large assembly of distinct combinations of composite materials, in the semiconductor range. The OWF will be a particular electro magnetic impact on a particular material combination, and the property will be the measured electro magnetic result. One possibility relates to the Compton effect: allowing a particular pattern of incident radiation to impact a combination (an ES element), where the scattered radiation will be evaluated as the property of the element. Incident radiation can vary in frequency, intensity and direction ranges, to make it unpredictable.

Thermodynamics may be involved by measuring the temperature change of an ES element, in response to a particular current, also ranging in frequency, intensity and duration. Different composite materials have different heat capacity and different conductivity resulting in a unique thermodynamic response.

Electro magnetically induced chemical changes can also be instantly measured. Such would apply to impact over molecular structure, molecular folding and interleaving, etc.

To use a physical FigLeaf device, it would be necessary to manufacture it efficiently, make copies of the device accessible to any pair of privacy seekers, and insure that the privacy killer cannot defeat the physical protocol by carefully studying it beforehand. It is also necessary for the PK to be prevented from running the measurement simultaneously on the entire ES.

The new technology of 3D printing can be used to transfer physical ES designs between parties.

6.4 IoT Implementation

Internet of Things devices are often equipped with limited computational capacity, and cannot form a private channel using algorithmic complexity. The FigLeaf protocol may be a viable alternative. In many cases large ensembles of mutually alien IoT devices require dynamic communication, often over a short span of time. Such cases can be served by a carefully designed FigLeaf configuration, supported by a reliable mechanism to leverage the temporary secret to a permanent one.

6.5 Identity Verification

Identity theft is the fastest growing crime in the US. Today's identities are fixed data elements which are compromised in many ingenious ways. One potential remedy is to shift to dynamic identities. Let Alice and Bob be two cyber space strangers involved in some interaction. This interaction instantly turns to be an element in the cyber history of both Alice and Bob. So when Alice tries to prove her identity to Carla she indicates her transaction with Bob. Carla can then query Bob to verify Alice's claim.

In a community of players it would be possible to keep track of activities and hence identities by establishing a System Tracker (ST). The ST will designate an entropic set, and perhaps even a list of OWF. When two players interact, they exercise the FigLeaf protocol, and create a shared temporary secret. They both register that secret with the System Tracker and link it to reporting their encounter. It would be useless for a privacy-killer to extract the temporary secret, because once it has been registered, it cannot be re-registered, and will expose anyone trying to register it, as a fraud.

6.6 Timing and Scalability

The FigLeaf protocol is highly scalable. The level of computational work needed is directly proportional to the required interval of privacy, IoP. Financial transactions may require very short IoP, a few seconds, and the respective extraction of the temporary secret may require one or few seconds too. Same for environments where a community of parties randomly need to establish secure channels. Such a community could be served by a readily accessible 'fountain of randomness' (FoR), so that even a short-lived temporary secret can be securely replaced by a permanent secret.

On the other end, critical connection that face an unknown adversary, may need to be established with the assumption that the computational power of the attacker is greater than would be normally suspected. And the more one allows for adversarial assailment power, the more work will be required by the FigLeaf procedure. Transfer of critical data that would be a high prize to an adversary may be handled with a FigLeaf version that may last several minutes before it concludes.

6.7 Internal Secure Channel

A protected cyber community may also require the benefit of a private channel, and will readily use the FigLeaf procedure. Let there be m players who all share a cryptographic key, k, with which they communicate among themselves, protected from the outside. Yet, two or more players in the community may wish to establish a secure channel, not visible to the others. These parties then will use their shared keys to encrypt an entropic set, and respective OWFs, and practice over it. Other members of the community will be able to read the ES and watch the OWFs but will not be able to pierce the bilateral secret established by the two privacy seekers. Outsiders, will not be able to read the ES, on account of not holding the shared community key, k, and will be further removed from cracking the secret.

Alternatively, the community will all use a password protected randomness fountain to build the ES from.

If a community is organized in hierarchies, then the same private channel procedure may be exercised at each level.

6.8 Secondary Security

Two well-acquainted parties sharing a secret, k, may use this secret to encrypt a FigLeaf setup, and practice it. They will then be protected against adversaries who got a hold of k, and double protected against adversaries unaware of k.

7.0 FigTree: Multi Party Privacy

The FigLeaf protocol may be readily extended to three or more parties. There are several configurations. We discuss three: (i) shared multi party privacy, (ii) bilateral privacy in a multi party setting, and (iii) Group-to-Group privacy.

7.1 Shared Multi-Party Privacy

We consider t privacy seekers: $PS_1, PS_2, \ldots PS_t$ who wish to share a private secret. They may use the FigLeaf procedure with a slight modification. Every PS is selecting $n_i$ elements in the ES, and each in turn chooses a previously unused property and its matching OWF, announcing the values of its selection to all other PS. The other players mark off candidates in their candidates list, just as in the bilateral version. The challenge this time is much more daunting, all t PS will have to have selected one shared element. If they did, then the process of announcing values of properties one by one will eventually flash out that shared element, (although much slower) and the group of privacy seekers will be able to share a temporary secret.

The chance calculus, though, is quite discouraging. Let element X be a shared item for $PS_1$ and $PS_2$. Let Pr[Match=1,2] be the chance for it to happen. $PS_3$ will have a probability of $((s-1)/s)^n$ not to match X with any of its n element choice, which translates into a chance of $1-((s-1)/s)^n$ to hit on X with its choice. All in all for three privacy seekers to share an element the chance will be:

$$PR[\text{Match: } 123] = PR[\text{Match: } 12] * \left(1 - \left(\frac{s-1}{s}\right)^n\right)$$

And for t privacy seekers:

$$PR[\text{Match: } 12 \ldots t] = \left(1 - \frac{((s-n)!)^2}{(s-2n)!s!}\right) * \left(1 - \left(\frac{s-1}{s}\right)^n\right)^{t-2}$$

The chance for a shared element to be found in a setting of t>2 players is very low. Illustration: for ES of size s=10,000, and pick lists of size n=250, the bilateral match probability is 99.8% while the chance for three privacy seekers all netting a match is 2.4%. And for a group of t=5, the chance for a match drops to 0.0015%.

The goal of a shared secret for a group of t>2 privacy seekers is more efficiently achieved by securing bilateral secrets among the group, and then using the shared bilateral secrets to extend a shared group secret.

7.2 Bilateral Privacy in a Multi Party Setting

Let t privacy seekers, $PS_1$, $PS_2$, . . . $PS_t$ exercise the FigLeaf protocol for the purpose of securing any matched secret between any of the t players. Let Pr[1-2 no match] be the chance for $PS_1$ and $PS_2$ not to have a match. For $PS_3$, we can compute a no match over the already selected $n_1$ and $n_2$ elements (the pick lists of $PS_1$ and $PS_2$ respectively). The first choice of $PS_3$ will have a chance of $(s-n_1-n_2)/s$, to be a "no match". For the second choice of $PS_3$ the chance of no match will be: $(S-n_1-n_2-1)/(s-1)$, and so on, for the i-th element of $PS_3$ the chance of no match will be: $(s-n_1-n_2-i+1)/(s-i+1)$. The persistent no match between the three privacy seekers will be the multiplication of these probabilities. And the match chance is the complement to one.)

$$Pr[\text{Any Match } PS_1, PS_2, PS_3] = 1 - \frac{(s-n_1)!(s-n_2)!(s-n_3)!}{(s-n_1-n_2-n_3)!(s!)^2}$$

This configuration amounts to double application of the "birthday effect", with remarkable results. Illustration: for an ES of size s=1,000,000 and $n_1=n_2=n_3=1000$ the regular bilateral chance for a match is 63%. For match between any two, the chance is 95%. And of course, the results become more dramatic for larger t values.

These results point to a very efficient way for a community of players in cyber space to create a mutually shared secret. They can first apply the 'any-which-way' procedure described herein, and create, say, one connection, between $PS_1$ and $PS_2$. Next the community will re-play the 'any-which-way' version of FigLeaf, with the exception that any two players who have already established a bi-lateral secret will not try to establish another one. For any instance where $PS_i$ connects to $PS_j$, while $PS_j$ connects to $PS_k$, $PS_j$ will readily connect $PS_i$ and $PS_k$, and the three will not have to seek another secret among them. When in a coming round of FigLeaf $PS_k$ connect to $PS_l$, then $PS_k$ will connect $PS_i$, and $PS_i$ with $PS_l$. The secure connection clusters grow very fast until everyone is securely connected to everyone. They will keep at it, until all are connected.

Figure 11:
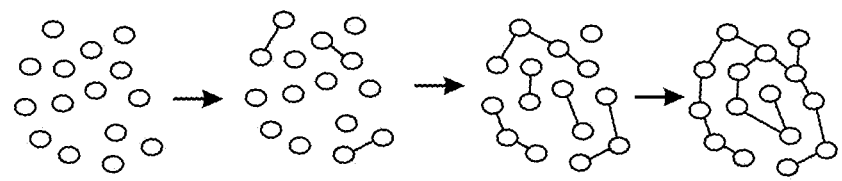

There are numerous cases when this situation applies: spontaneous rise of networks, dynamic cyber identities, etc. See FIG. 11.

7.3 Group-to-Group Privacy.

Consider two groups α and β, comprised of $α_1$, $α_2$, . . . and $β_1$, $β_2$, . . . , players respectively. Each group is fully connected within itself, namely: sharing a group secret, but no α player is securely connected to any β player. To do so they may exercise the FigLeaf protocol between t representatives of each group, seeking a single match by each picking n elements in the ES. Any representative from any group will hope for a match with any representative of the opposite group. This will allow for $t^2$ possible bilateral connections, or to a match probability given by:

$$Pr[\alpha\beta - \text{match}] = 1 - \left(\frac{(s-n_a)!(s-n_b)!}{(s-n_a-n_b)!s!}\right)^{t^2}$$

where $n_a$ and $n_b$ is the size of the pick-lists of groups α and β respectively.

Illustration: for $s=10^9$, $n_a=n_b=5000$. The regular bilateral probability for a match is 2.4%. For two groups, each deploying t=10 players, the chance for a match between anyone from one group with anyone from the other is 92%. By each group deploying more players to achieve the privacy, the effect of the procedure grows dramatically. Unlike, say, the Diffie Hellman solution, which is strictly bilateral, the FigLeaf privacy may be extended to group settings.

8.0 Zero-Knowledge of the 2nd Kind

A zero knowledge algorithm (of the first kind), is one where no information is leaked beyond what is revealed on purpose. However, the algorithm itself is "leaking". Complex algorithms, as are normally used in cryptography, harbor hidden vulnerabilities, that may require a great deal of mathematical digging to spot them. And in today's raging cyber war, leakage of the deployed algorithm may be catastrophic. A persistent adversary will exploit any intelligence about our operation, and hence it is our objective to leak as little as possible with respect to our cryptographic strategy. Lavish use of ad-hoc randomness is one potent strategy. We have today the technology to generate large quantities of quantum-grade randomness on demand. This denies our adversary the chance to somehow steal or reveal that randomness ahead of time of its usage.

The FigLeaf procedure calls for ad-hoc definition of the entropy set to deny an adversary the chance to study it, prepare, and thereby shrink our interval-of-privacy (IoP). But the FigLeaf procedure also calls for the deployed one way functions to be randomly selected, so that there will be no mathematical functions for our adversary to study, and find vulnerabilities in. This is zero-knowledge of the 2nd kind.

9.0 the Perfect is the Enemy of the Good

This old Polish idiom reflects the reality of two strangers seeking privacy in a hostile environment, where all their communications are exposed to their adversary. This objective may be too ambitious and achievable only against a well-bound adversary. The prevailing solutions rely on unproven intractability assumptions, and their users operate under the specter of hidden eyes exposing them behind the dark veils drawn by the all powerful cryptanalytic enterprises.

The FigLeaf solution has ratcheted down this lofty objective of durable privacy, and is striving to achieve temporary privacy in its stead. Using "Zero Knowledge of the 2nd Kind" FigLeaf denies its adversary the chance to study its deployed algorithms and efficiently compromise its used randomness. The FigLeaf procedure guarantees a temporary entropic advantage. An adversary with more computing power, will limit the interval of privacy (IoP) to a shorter time span, but will not be able to eliminate it altogether. The FigLeaf user, on the other hand, will be able to increase the IoP at will, albeit at an ever higher price of procedure exercise time.

Three-D Printed FigLeaf Reference Set

This section describes a FigLeaf operation based on a physical shared reference set.

Introduction (3D Printed Brick)

The Reference Set in the FigLeaf protocol may be established in various categories:

A set comprised of abstract mathematical constructs
A set comprised of dedicated database elements
A set comprised of physical entities Here we describe a special class of physical entities that may comprise the FigLeaf reference set: a 3D-Resistance Variant contraption.

Basic description: Consider a three dimensional 'brick' with dimensions X,Y,Z corresponding to length, width, and height. Consider a "point element" inside the brick, identified by its coordinates $\{x,y,z\}$ where $0 \le x \le X$, $0 \le y \le Y$, $0 \le z \le Z$. The point element is a tiny element of the brick with dimensions dx, dy, and dz respectively. Let that "point element" be comprised of a material with electric resistance $\rho(x,y,z)$. Let $\rho(x,y,z)$ be a random value drawn from the interval $\rho_l$-$\rho_h$. Namely: $\rho_l \le \rho(x,y,z) \le \rho_h$.

Let A and B be two arbitrarily chosen points in the brick: $A\{x_a, y_a, z_a\}$, $B\{x_b, y_b, z_b\}$. One could readily measure the resistance, $R_{ab}$ between points A and B by applying a potential gradient $\Delta V_{ab}$ over the points A and B, and measuring the resulting current $i_{ab}$:

$$R_{ab} = \Delta V_{ab}/i_{ab}$$

$R_{ab}$ depends on the randomized resistance values of the points leading from A to B.

In theory, knowledge of the $\rho$ values throughout the brick would allow one to theoretically compute the resistance $R_{ab}$ between two arbitrary points A and B, but at present such a computation is exceedingly tedious, even with a perfect knowledge of the resistance distribution over the brick. By contrast, application of a voltage difference between A and B and measuring the resultant current will gauge that resistance fast and easy.

For a party who does not posses the value distribution of $\rho$, the randomized nature of $\rho$ will void any chance to compute or guess $R_{ab}$ with any probability above negligible.

Let Alice and Bob be two privacy seekers using the FigLeaf protocol to establish privacy in cyber space. Let us assume that both of them, each holds an identical copy of a brick as described above. Alice and Bob would then be able to exercise the FigLeaf protocol as follows:

Let Alice randomly select $n_a$ points throughout the brick, while Bob randomly selects $n_b$ points off the same identical brick. Alice will then select a projecting point $P1_a$ on the brick, and measure the $n_a$ resistance values, $R_{1p1}$, ... $R_{ip1}$, ... $R_{nap1}$, for i=1, 2, ... $n_a$. Namely Alice will measure the resistance values between each of her randomly selected points 1, 2, ... $n_a$ and the projecting point P1.

Bob will also randomly choose $n_b$ points on the same brick. Alice will then communicate to Bob the coordinates of point P1, which will allow Bob to measure the $n_b$ resistance values between his randomly chosen points 1, 2, ... $n_b$ and P1. Alice will then communicate to Bob the values of the $n_a$ resistance values she measured, which will allow Bob to discard all the points in his selection of $n_b$ points that have resistance values not listed in Alice's list. Bob's list of candidate will then shrink from $n_b$ to $n'_b$ Then the roles of Alice and Bob will be switched. Bob will choose a projecting point P2≠P1, measure the resistance values between P2 and his current list of candidates for a match ($n'_b$ points), communicate P2 and the values of his measured resistances to Alice, and she will discard all the points she selected and that measured resistance values to P2 that were not listed in Bob's list.

And so on, according to the FigLeaf protocol.

As discussed above a privacy killer not in possession of the "brick" has virtually zero chance to interfere with the privacy establishment of Alice and Bob. As to a privacy killer in possession of the brick, the obstacles are the same as any other exposed reference set because clearly, as constructed, the brick is a FigLeaf reference set.

Once an electrode point has been identified as a shared selection between the privacy seekers, then the value of its coordinates on the brick may be the shared secret used by the privacy seekers, or, in turn, the privacy seekers may use a lookup table, or exercise an equivalent function to map the coordinates of the shared points to a different data item.

The FigLeaf Brick

The FigLeaf brick may take any three-dimensional or two-dimensional form, not necessarily a "brick-like" shape. What is required is for a bulk comprised of several materials intermixed in a randomized way, where these materials each has a different conductivity. This construction will create a situation where the resistance registered between two arbitrary points on the brick is determined by which materials are spread between these two points and at which boundaries. Measuring the resistance is fast and accurate. It is given as the ratio between the voltage difference between any two points on the brick and the resulting current.

The brick is deemed to be the reference set for the FigLeaf procedure, with the electrode-points identifying the elements of this reference set. An electrode-point is a well-defined point on the brick where an electrode may be placed. An electrode-point is defined by its coordinates: $\{x,y,z\}$. Since both Alice and Bob need to repeat the same measurement it is necessary that the electrode points will be well defined. There are several ways to doing so, e.g.: to imprint on the surfaces of the bricks contact points with well defined coordinates. Such contact points could be imprinted inside the brick too.

Using common chip technology it would be common place to build some conductivity bricks, say, in a form of a cube comprised of six surfaces, where each surface will have $10,000 \times 10,000 = 10^8$ electrode points or more and together $6*10^8$ points.

The most advanced way to construct the brick is to use 3D printing. A perfectly randomized function will define the mix of some m types of materials comprising the brick. Once the desired number of bricks has been printed, the mold is discarded, namely the randomized function that governed the printing is destroyed so no more identical bricks can be built. A 3D printed bricks will be very hard to reverse engineer, and redefine the printing function in order to build a copy of the brick. The motivation to do so is low because even a hacker aware of the brick will be held back by the protocol.

Operating the 3D printer, all the multi-variant conductivity materials will be available for spot printing to ensure any desired resolution of mixing between the constituent materials of the brick.

FigLeaf Brick Operation

Alice and Bob, each having an exact copy of the FigLeaf brick is each selecting n electrode points on it (for the case where $n=n_a=n_b$). Then Alice picks some other electrode point—the projecting point and measures the resistances between it and each of her randomly selected choices. She communicates the address of the projecting point and the resistance measurements to Bob. Bob regards those resistance measurements as properties of the selected electrode points and proceeds according to the FigLeaf procedure.

To insure coordinated measurements Alice and Bob may divide the maximum range resistance reading to h intervals, and replace the exact measurement with the interval in which it falls. If a measurement falls very close to the boundaries of an interval then the party that sends the measurements to the other identifies the two intervals to cover for the possibility of a slight measurement error. It will slow a bit the procedure, but will insure accuracy.

To counter however slight differences in measurement owing to temperature variations, or electro-magnetic field variance, the procedure could be modified by selecting two reference points on the brick: S $(x_s, y_s, z_s)$ and Q $(x_q, y_q, z_q)$, the resistance between these two point $R_{qs}$, will be measured and will be used to normalize the resistance measurements of the protocol, by dividing the computed resistances in the protocol to $R_{qs}$.

Each point on the brick will be associated with a numeric value that may be computed from its location address on the brick, this numeric value will be the shared secret of the privacy seekers, or the basis from which a shared secret is derived.

The use of the brick may be (i) private, (ii) semi private, or (iii) public. In the private setting two privacy seekers will arm themselves each with an exact copy of a brick that was 3D printed from an ad-hoc random number generator that was applied twice, and then discarded, to prevent any more copies. While the privacy seekers could use the data extracted from the brick directly as a source of their privacy, they would add a layer of security by using the brick in the FigLeaf protocol. A semi private mode is where a group of players all share a brick, which they keep secret from others. This brick will allow any two players in that group to communicate privately using the FigLeaf protocol. Others in the group could in theory mount a heavy-duty hacking effort, but are not expected to. If they do, they will fail, if the privacy seekers operate as described herein, namely with sufficient combinatorics defense. In the public mode one may envision assorted bricks available for sale, so that any two strangers may agree to use the same public brick to exercise the FigLeaf protocol. The assortment of bricks will make it extremely difficult for any party to crack and compromise every possible brick as it appears on the market.

In general we have with FigLeaf two rings of security—security against attackers not in possession of the brick and security against attackers who do possess the brick. The first kind is well protected from because of the randomized nature of the brick, and the second kind is protected against by the calculus of combinatorics.

Hacking the FigLeaf Brick

The simple way to hack the FigLeaf brick is to follow on the dialogue between the privacy seekers, and then apply the information over the brick (referring to an attacker in possession of the brick). The difficulty before the hacker is well known to the privacy seekers, it is expressed via the number of possible electrode points, and the time needed to exercise a measurement of current between any two electrode points. The hacker will learn that the n electrode points randomly selected by a privacy seeker measured n current values relative to a projection point, also communicated in the open. Since this communication point was not identified before, the hacker could not have pre-measured those currents and build a hacking database for it. It is theoretically possible for a hacker holding the brick to pre-measure the currents between any possible electrode point to any other electrode point, which will require a database of the size of the square number of electrode points on the brick.

Given a brick, in the current technology, it is very difficult to measure and determine its composition in sufficient accuracy, and more difficult to build one, using the 3D printing technology or any other technology. It is also not feasible today to theoretically compute the current measurements between two random points of the brick (with sufficient accuracy). The power of the brick is in part due to the fact that it is easy to write a 3D printing instruction set, fed and powered by a stream of perfectly randomized bits, but it is nearly impossible to duplicate the brick without the possession of the generating random bits, which are to be destroyed and discarded after printing the desired number of bricks.

The brick may be reduced to a two dimensional setting, which will make it easier to implement and build, the principles will stay the same.

What is claimed is:

1. A computer-implemented method comprising a computer communication network, where parties A, B, and C are active nodes, and where parties A and B are mutual strangers, having no prior exchange of information, and where the method enables party A and party B to establish a shared secret using only bilateral network messages, the contents of which is exposed to party C who wishes to prevent parties A and B from establishing a shared secret, and a publicly exposed set S comprising s mathematical entities where each entity has p properties, where each property i (i=1, 2, ... p) has a range of r possible values $v_{i1}, v_{i2}, \ldots v_{ir}$ and where (i) party A randomly and secretly selects n elements in S: $a_1, a_2, \ldots a_n$, designated as "Party A Candidates", and party B randomly and secretly selects n elements in S: $b_1, b_2, \ldots b_n$, designated as "Party B Candidates", then (ii)

party A selects a property i (i=1, 2, ... p) and communicates to party B the values of property i within the Party A Candidates: $a_{1i}, a_{2i}, \ldots a_{ni}$, referred to as "Property i list of Party A", then (iii)

party B eliminates from Party B candidates all the entities for which the value of property i is not listed in Property i list of Party A, then (iv)

party B selects a property j (j=1, 2, ... (i−1), (i+1), ... p) and communicates to party A the values of property j within the Party B Candidates: $b_{1j}, b_{2j}, \ldots b_{n'j}$, referred to as "Property j list of Party B", and where n'≤n is the number of party B candidates after step (iii), then (v)

party A eliminates from Party A candidates all the elements for which the value of property j is not listed in Property j list of party B, and where (vi) parties A and B repeat steps (ii)-(v) with other properties k, l, m . . . where (k, l, m=1, 2, . . . p) until either:

(α) party A or party B are left with no candidates, in which case party A and party B repeat steps (i) to (vi), or (β) party A is left with one candidate, and party B is left with the same candidate, which is used as a shared secret encryption key by either party A, or party B to pass a digital coin or any token to the other party, for secure decryption of the coin or token.

2. The method of claim 1 also comprising a public ledger and a Verifier node that verifies that parties A and B participated in the process of method 1, wherein the property lists for the various properties which passed between party A and party B, referred to as "the Dialogue," is being stored in the public ledger, so that parties A and B will prove that they have been the parties to the Dialogue by exposing Party A Candidates and Party B Candidates so that the Verifier can verify that the Party A Candidates and the Party B Candidates when handled via the method in claim 1 generate the dialogue as stored in the public ledger.

* * * * *